(12) United States Patent
Makino

(10) Patent No.: US 6,672,418 B1
(45) Date of Patent: Jan. 6, 2004

(54) ELECTRIC MOTOR-ASSISTED VEHICLE

(75) Inventor: Satoshi Makino, Iwata (JP)

(73) Assignee: Yamaha Hatsudoki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/340,340

(22) Filed: Jun. 25, 1999

(30) Foreign Application Priority Data

Jun. 29, 1998 (JP) .......................................... 10-181977
Mar. 29, 1999 (JP) .......................................... 11-087263

(51) Int. Cl.[7] .............................................. B62K 11/00
(52) U.S. Cl. ...................................................... 180/205
(58) Field of Search ................................. 180/205, 206, 180/507, 220

(56) References Cited

U.S. PATENT DOCUMENTS

| | | | | |
|---|---|---|---|---|
| 4,410,060 A | * | 10/1983 | Cunard | 180/205 |
| 5,370,200 A | * | 12/1994 | Takata | 180/206 |
| 5,491,390 A | * | 2/1996 | McGreen | |
| 5,749,429 A | * | 5/1998 | Yamauchi et al. | 180/205 |
| 5,758,736 A | * | 6/1998 | Yamauchi | 180/220 |
| 5,836,414 A | * | 11/1998 | Seto et al. | 180/207 |
| 5,845,727 A | * | 12/1998 | Miyazawa et al. | 180/205 |
| 5,915,493 A | * | 6/1999 | Nakayama | 180/206 |
| 6,073,717 A | * | 6/2000 | Yamamoto et al. | 180/205 |
| 6,487,936 B1 | * | 12/2002 | Wu et al. | 180/206 X |

FOREIGN PATENT DOCUMENTS

| JP | 9301262 | * 11/1997 |
|---|---|---|
| JP | 10119873 | * 5/1998 |

OTHER PUBLICATIONS p. 443—"Mechanical Engineering Design", Third Edition, Joseph Shigley—ddated Dec. 1977.*
Plastics—Dubois and John 5th Edition p. 233—teaches use of plastic as a gear material.*
Machinery's Handbook—Oberg, et al 24th Edition p. 2016—teaches use of aluminum as a gear material.*
Hnadbook of Practical Gear Design, Dudley, pp. 1.5–1.7, dated 1984.*

* cited by examiner

Primary Examiner—Brian L. Johnson
Assistant Examiner—Bryan Fischmann
(74) Attorney, Agent, or Firm—Ernest A Beutler

(57) ABSTRACT

A simplified and low cost torque sensor for a motor assisted manually operated vehicle. The torque sensor is operated by a differential transmission that transmits no driving force for the vehicle. Thus it can be constructed from low cost light weight materials such as aluminum or plastics. This also provides more latitude in the placement of the sensor. A variety of possible differential transmissions are disclosed utilizing either one or two coupled planetary transmissions.

7 Claims, 20 Drawing Sheets

| Input | Layout | | Output | Increase ratio (Output/Phase difference) |
|---|---|---|---|---|
| Sun gear | Ex. 1 | 47, 43, 45, 44, 48, 46, 41, 42, 38 Sensor, 39 | Outer circumferential gear | $\dfrac{1}{\dfrac{R_T}{S_T}+1} \times \left(1+\dfrac{S_T}{R_T}\right) = \dfrac{1}{3}$ (Normal) |
| Sun gear | Ex. 2 | 47, 48, 45, 43, Sensor, 41, 42, 46, 44, 38, 39 | Carrier | $\dfrac{S_T}{R_T} \times \dfrac{1}{\dfrac{S_T}{R_T}+1} = \dfrac{1}{4}$ (Reverse) |
| Outer circumferential gear | Ex. 3 | 47, 43, 48, 45, 41, 46, Sensor, 42, 44, 38, 39 | Carrier | $\dfrac{R_T}{S_T} \times \dfrac{1}{\dfrac{R_T}{S_T}+1} = \dfrac{3}{4}$ (Reverse) |
| Outer circumferential gear | Ex. 4 | 47, 45, 44, 48, 43, 41, 42, Sensor, 46, 38, 39 | Sun gear | $\dfrac{1}{\dfrac{R_T}{S_T}+1} \times \left(\dfrac{R_T}{S_T}+1\right) = 3$ (Normal) |
| Carrier | Ex. 5 | 47, 43, 48, 45, 46, 41, 42, 44, 38, 39, Sensor | Outer circumferential gear | $\left(\dfrac{R_T}{S_T}+1\right) \times \dfrac{S_T}{R_T} = \dfrac{3}{4}$ (Reverse) |
| Carrier | Ex. 6 | 47, 43, 48, 45, 46, 41, Sensor, 42, 44, 38, 39 | Sun gear | $\left(\dfrac{S_T}{R_T}+1\right) \times \dfrac{R_T}{S_T} = 4$ (Reverse) |

*Figure 17*

ELECTRIC MOTOR-ASSISTED VEHICLE

BACKGROUND OF THE INVENTION

This invention relates to a motor power assisted vehicle and more particularly to an improved sensor and control arrangement for said vehicles.

An increasingly popular type of vehicle is one which is designed so as to primarily operated by the power of the user. Examples of this type of vehicle are power assisted bicycles and wheelchairs. The primary motive power for the vehicle is, as with purely manually powered vehicles, the manual input force of the rider.

However, in order to make these vehicles more accessible and available, particularly by people who might not otherwise be able to use them, it has been proposed to provide an assist motor that will augment the manual power under some circumstances. These types of devices generally use some form of input force sensors so as to sense the amount of manual input force applied by the vehicle rider or operator. Then, a motor assist is provided which adds to the manual force in some ratio so as to permit the user to have this assist. Because the amount of power assist is based upon the amount of manual force applied, it is not likely that the vehicle will overspeed or that the rider can loose control of the vehicle.

Obviously, therefore, it is necessary for these vehicles to have a very effective and also sensitive mechanism that senses the manual force input by the operator. One common way this is done is to couple the manually operated driving member of the vehicle to the driven element, such as a driven wheel, through a planetary transmission. The braked member of the planetary transmission, normally the sun gear, is permitted to rotate slightly with a spring bias resisting this rotation. Thus, by determining the amount of deflection of the spring and rotation of the normally braked gear it is possible to measure the manual force input. This provides a very effective and relatively simple type of force sensor.

With this type of vehicle, however, there are some disadvantages particularly relating to the force sensors. Since the force sensor is associated with the transmission that couples the manual power to the driving component of the vehicle, the sensor and its components must be of sufficient strength and size so as to accommodate all of the driving loads. This makes the mechanism rather bulky and requires all elements of the sensing mechanism to have adequate strength to provide the transmission of power. Thus, it is frequently necessary to employ materials in the entire transmission that have high rigidity and frequently heat treated gears having substantial widths and diameters are employed.

In addition to the cost disadvantage, it must also be remembered that this type of vehicle is primarily an adaptation of a purely manually operated vehicle. That is, in order to save cost and components it is desirable if the basic vehicle can be substantially the same as its purely manually powered counterpart and only modified to the minimum extent necessary to accommodate the power assist components.

However, when large transmissions and force sensors are employed, this makes the structure more expensive and more cumbersome. In addition, the placement of the components with this type of mechanism is somewhat dictated by the location of the driving transmission and thus, space utilization is deteriorated.

In addition to these difficulties, the assist mode frequently drives the vehicle through at least part of a common transmission with the manual drive. This further makes the system more complicated and more difficult to incorporate into a conventional vehicle structure.

It is, therefore, a principal object of this invention to provide an improved, simplified and low cost force sensor for a power assisted manually operated vehicle.

It is a further object of this invention to provide a force sensor for sensing the manual force input to such a vehicle with a relatively simple, low cost structure and one which can be placed at a wide variety of locations without substantial modification of the basic vehicle.

It is a further object of this invention to provide an improved, simplified and low cost force sensor for sensing the manual force applied to a vehicle without the necessity of having the force sensor mechanism being robust enough to transmit the driving load for the vehicle.

SUMMARY OF THE INVENTION

This invention is adapted to be embodied in a power assisted manually powered vehicle having at least one driving wheel. An operator driven driving member to which an operator applies a manual force is provided. A first transmission couples this driving member to the driven wheel for operator power driving of the vehicle. An assist motor is provided for exerting a driving force to the vehicle through a second transmission. A differential transmission is connected between the operator driven driving member and the driving wheel for providing a signal indicative of a change in phase between the operator driven driving member and the driving wheel. A phase change sensor is associated with the differential transmission for providing a signal indicative of the change in phase. Control means are responsive to the output signal of the phase change sensor for supplying an amount of power from the assist motor for assisting in the driving of the vehicle.

BRIEF DESCRIPTION OF THE DRAWINGS

FIG. 17 is a diagram that shows how the transmission shown in several of the embodiments already disclosed and other relationships can be employed by changing the input and outputs of the respective planetary transmissions so as to achieve a variation in the output signals in relation to the differential rotation between the manual input shaft and the driving shaft.

DETAILED DESCRIPTION OF THE PREFERRED EMBODIMENTS OF THE INVENTION

Figure 1:
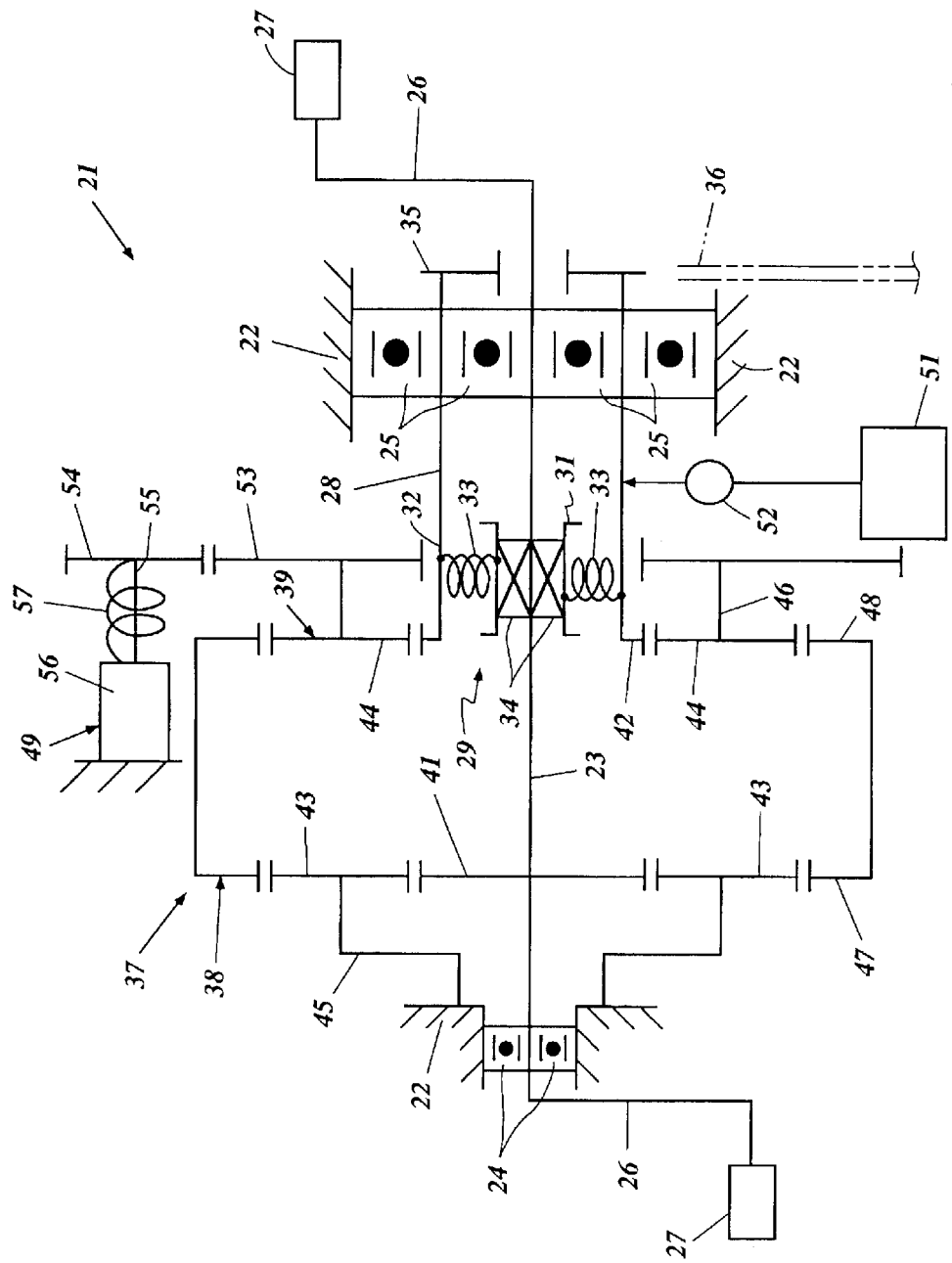
FIG. 1 is a partially schematic cross-sectional view taken through the transmission mechanism of a power assisted manually operated vehicle constructed in accordance with a first embodiment of the invention.

Before describing any specific embodiment in detail, a general description is believed to be helpful in permitting those skilled in the art to understand how the various embodiments interrelate with each other and the principal under which the invention operates. As has been previously noted, the conventional type of torque or force sensor employed for the determining the manual input force has been associated with the basic or first transmission that interconnects the manually operated component of the vehicle with the driving element. Thus, the forces of driving are transmitted through the same mechanism as is applied to the force sensor and this provides the disadvantages noted above. Briefly summarized these are high cost, more complicated structure and difficulties in having latitude as to where the various components are located.

In accordance with the invention, a lost motion connection is provided in the manual drive first transmission between the operator input member and the driven member. A spring biasing arrangement is provided in this lost motion connection so as to resist the relative movement and thus provide an arrangement wherein the manual force can be measured. A differential transmission is interposed in one of a number of manners which will be described shortly between the manual input member and the driven member of the first transmission for measuring the amount of relative rotation between these two members permitted by the lost motion connection.

This differential transmission, which for the most part is of the planetary type, does not have to transmit any of the driving loads and thus can be made quite simple and from low cost materials such as plastics or the like. Also, this transmission can be located in any of a variety of locations for driving a sensor which is positioned in a wider variety of locations than previously possible. Thus, the device is simplified and becomes more versatile.

Now will be described several embodiments of the invention. In the following description, components which perform these same functions but which may differ somewhat in structure have been identified by the same reference numerals in order to facilitate understanding.

Embodiment of FIG. 1

Turning now to the first embodiment of FIG. 1, this figure is a partially schematic cross-sectional view and shows the combined manual first transmission and assist transmission mechanism including a differential sensing transmission, as indicated generally by the reference numeral 21. The vehicle per se is not shown in this figure although some of the later embodiments show in more detail portions of the actual construction of the associated vehicle. In each embodiment, the vehicle with which the transmission 21 is associated is a bicycle. However, those skilled in the art will readily understand how this invention can be utilized with any of a wide variety of types of vehicles that are normally manually operated but which can benefit by a power assist.

The vehicle basically includes a frame member 22 that journals a crankshaft 23 which forms a portion of the first transmission for rotation about an axis defined by bearings 24 and 25 carried at opposite sides of the frame member 22. The crankshaft assembly 23 has crank arms 26 that extend beyond these bearings 24 and 25 and which carry pedals 27.

In an actual physical embodiment, the frame member 22 would be a cross tube that is disposed at the lower portion of the frame assembly of the associated bicycle and generally at the base of the seat post. Of course, the actual physical relationship can be varied and will be varied when applied to other types of vehicles.

The bearing 25, in addition to journaling the crankshaft 23 journals an output or driving shaft 28 which is a tubular shaft and which extends around the outer periphery of the crankshaft 23 and which also forms a portion of the first transmission.

The crankshaft 23 is coupled to the driving shaft 28 by means of a lost motion connection, indicated generally by the reference numeral 29 and which generally includes an inner member 31 and an outer member 32 with biasing springs 33 interposed therebetween so as to yield when a force is applied to the crankshaft 23 and permit some relative rotation until some form of positive stop is engaged. The lost motion connection also forms a portion of the first transmission.

A one-way clutch 34 is interposed between the crankshaft 23 and the inner member 31 of the lost motion connection 29. This one-way clutch will permit the driving shaft 28 to override the crankshaft 23, for example when coasting.

The driving shaft 28 has affixed to one of its ends a driving sprocket 35. This driving sprocket 35 drives a chain or belt 36 which, in turn, is in engagement with a further sprocket or toothed pulley associated with the driven wheel of the vehicle and thus completes the first transmission.

It should be noted that the reference is made to a driven or driving wheel for a vehicle as would be the case with land vehicles. However, other forms of propulsion systems can be employed particularly if the associated vehicle operates on other than the land.

It has been previously noted that the driving crankshaft 23 is connected to the vehicle driving shaft 28 by the lost motion connection 29. This degree of lost motion will be indicative of the manual input force applied and this is measured by a differential transmission, indicated generally by the reference numeral 37.

This differential transmission 37 is, in most embodiments of the invention, comprised of a pair of coupled planetary gear sets or transmissions 38 and 39 each of which is associated with certain components of the transmission and specifically related to the crankshaft 23 and driving shaft 28. The planetary transmissions 38 and 39 Win this and in other embodiments to be described later, are comprised of respective sun gears 41 and 42. These sun gears 41 and 42 are enmeshed respectively with a plurality of respective planet gears 43 and 44. The planet gears 43 are carried by a carrier 45. The planet gears 44 are carried by a carrier 46. At the outer peripheries, the planet gears 43 and 44 are engaged with respective ring gears 47 and 48.

The differential movement determined by the differential planetary transmission 37 operates a torque sensor 49, in a manner which will be described, so as to provide a signal indicative of the input force applied by the rider. This torque sensor 49 outputs a signal to a control system (not shown) which can operate on any suitable principal so as to provide a degree of power assist to an electric motor 51.

The amount of power assist can be varied by means of varying the voltage, amperage either via resistors or by chopper circuits. The electric motor 51 thus outputs a predetermined degree of assist power which is transmitted through a transmission 52 to assist in driving the driving shaft 28 along with the manual input force. This transmission 52 includes a one-way clutch so that the driving shaft 28 does not drive the electric motor 51.

In this embodiment, the number of teeth on the sun gears 41 and 42 is the same as the number of teeth on the sun gears 43 and 44. In addition, each planetary transmissions 38 and 39 has the same number of planet gears 43 and 44 and those gears have the same number of teeth. The ring gears 47 and 48 of the two planetary transmissions 38 and 39 have the same diameter and the same number of teeth so that the ratios in the two transmissions 38 and 39 are the same. As will be described later, this same relationship need not be incorporated in all applications of the invention.

In this embodiment, the sun gear 41 of the planetary transmission 38 is affixed to for rotation with the crankshaft 23. In a similar manner, the sun gear 42 of the planetary transmission 39 is affixed to the driving sprocket 35 and, accordingly, the driving shaft 28. The carrier 45 of the planetary transmission 38 is affixed suitably against rotation to the frame member 22 of the vehicle.

Hence, rotation of the crankshaft 23 will effect a driving relationship through the sun gear 41 to the planet gears 43 so as to rotate the ring gear 47 in a given direction. The ring gear 47 is, in this embodiment, affixed to and rotates with the ring gear 48 of the planetary transmission 39. Hence, rotation of the ring gear 47 will effect a like rotation of the ring gear 48 so as to rotate the planet gears 44.

Since the sun gear 42 of the planetary transmission 39 is affixed to the driving shaft 28, the carrier 46 will rotate in one direction or the other depending upon the relative rotation between the crankshaft 23 and the driveshaft 28. Assuming the vehicle is being accelerated, this rotation will cause the carrier 46 to move in one direction. This rotates a sensor drive gear 53 that is affixed to the carrier 46 in a suitable manner in a like direction.

The sensor drive gear 53 is, in turn, enmeshed a sensor driven gear 54 that is affixed to a shaft 55 journalled in the body 56 of the sensor 49. The sensor 49 may be a potentiometer with the sensor shaft 55 being the wiper shaft thereof. Hence, the sensor 49 will provide a signal indicative of the degree of relative rotation between the crankshaft 23 and the driving shaft 28 and changes in this rotation will indicate whether the operator is increasing or decreasing the force relative to the driven wheel of the vehicle.

A torsional spring 57 cooperates with the potentiometer shaft 55 so as to resist its rotation and thus provide in addition to the springs 33 a resistive force so as to facilitate the torque measurement. In addition, this action on the gear 54 will tend to rotate the planetary transmissions 38 and 39 and thus will take up the backlash in these transmissions.

Thus, by measuring the degree and direction of relative motion between the shafts 23 and 28 it is possible to control the assist motor 51 so as to provide no assist, increasing assist or decreasing assist depending upon whether the rider is attempting to accelerate or decelerate the vehicle.

Since neither the planetary transmissions 38 and 39 nor the sensor drive transmission comprise of the gears 53 and 54 transmit any driving load these gears can be made quite light as previously noted and thin. Thus, the assembly can be quite low in cost and nevertheless still provide a very accurate and reliable signal of operator demand or input torque.

The specific or exact form of control routine employed for controlling the motor 51 may be of any type many of which appear in the published patent art.

Figure 2:
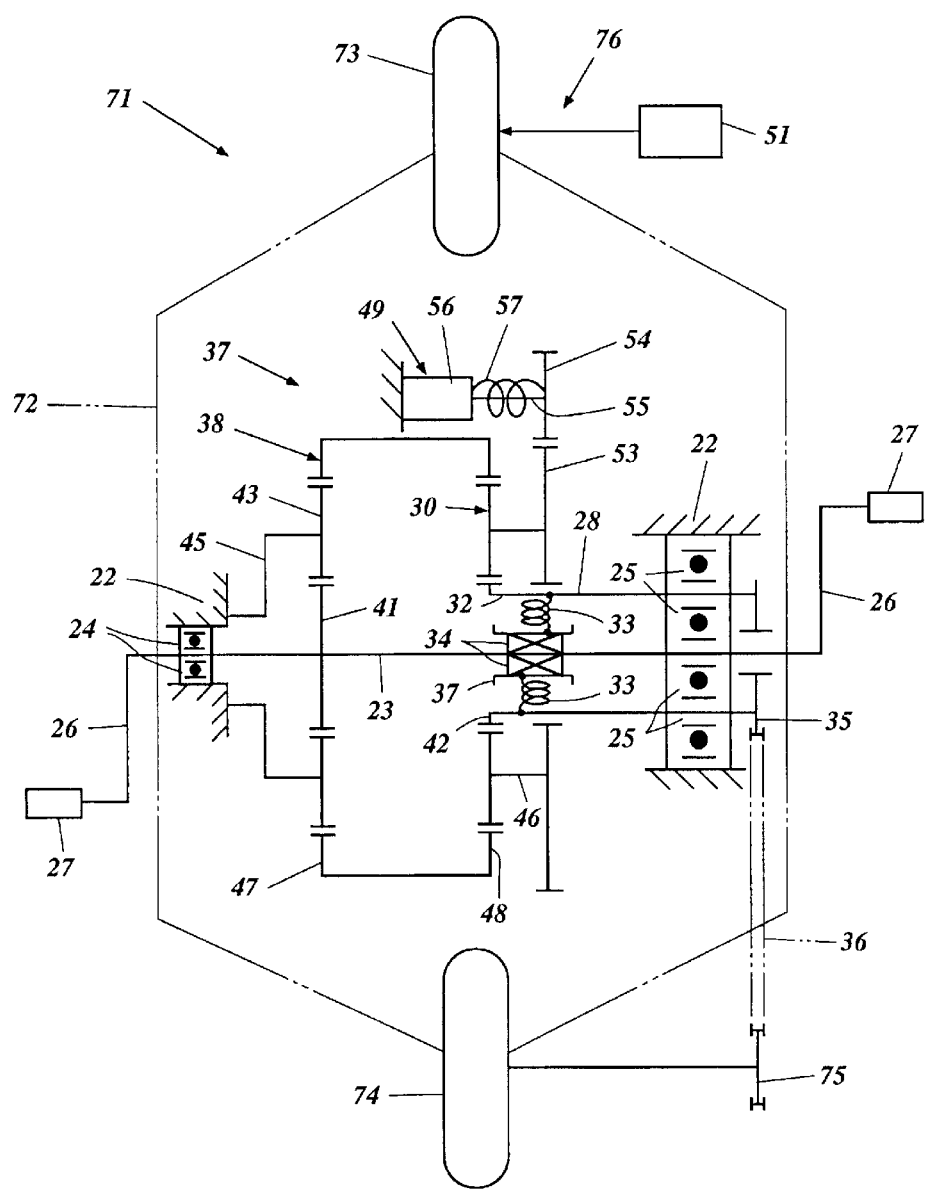
FIG. 2 is a partially schematic top plan view, in part similar to FIG. 1, of a vehicle constructed in accordance with a second embodiment of the invention and showing the driving transmission in a schematic form similar to that shown in FIG. 1.

Embodiment of FIG. 2

FIG. 2 shows another embodiment of the invention and this figure shows schematically how the transmission shown generally in FIG. 1 and manual power drive mechanism can be incorporated in a complete vehicle such as a motor assisted bicycle, indicated generally by the reference numeral 71.

The bicycle 71 has a frame assembly that is shown schematically at 72 and which dirigibly supports a front wheel 73 and a manually driven rear wheel 74. In this embodiment, the transmission and torque sensing mechanism for transmitting the power from the pedals 27 to the rear wheel 74 through the driving sprocket 35 chain or belt 36 and a final drive sprocket 75 that is fixed in a known manner to the rear wheel 74 is the same as that previously described. For that reason, these components have been identified by the same reference numerals and will not be described again.

In the previous embodiment, the electric assist motor 51 drove the drive shaft 28 which also transmitted power to the rear wheel 74. In this embodiment, on the other hand, the electric assist motor 51, which is controlled and operated in the manner previously described, is associated with and drives the front wheel 73 through a transmission which is shown schematically at 76.

This transmission 76 and the drive motor 51 may be conveniently mounted within the hub or rim of the front wheel 73 so as to provide a neat and compact assembly and also so as to facilitate the adaptation of the electric motor assist to a conventional type bicycle.

Thus, to modify such a conventional type bicycle to have the power assist mechanism, the driving arrangement between the pedals 27 and the sprocket 35 can be mounted in the frame of the conventional bicycle. This is facilitated by the compact and simple torque sensing arrangement provided by the sensor 49 and its drive through the differential transmission 37. The front wheel 73 can be adapted to incorporate the driving motor 51 and the transmission 76, as should be readily apparent to those skilled in the art.

Embodiment of FIGS. 3–10

FIGS. 3–10 show a third embodiment of the invention. This embodiment, like the embodiment of FIG. 2, has the electric assist motor 51 associated with the front wheel of the bicycle or associated vehicle and thus this structure is not shown in these figures.

In the previously described embodiments, the differential planetary transmission 37 associated with the torque sensor 49 was positioned axially between the outermost bearings 24 and 25 which supported the crankshaft 23. Also, the lost motion coupling between the crankshaft 23 and the driving shaft 28 was positioned between these bearings. Although such arrangements have some advantages, in some instances, a greater latitude may be desired in the positioning of the sensor 49 and also it may be desirable to provide a lost motion connection wherein the resilient spring assemblies have a greater radial distance from the axis of rotation of the crankshaft 23. This can permit a greater degree of lost motion if desired and can provide a more sensitive arrangement.

Figure 3:
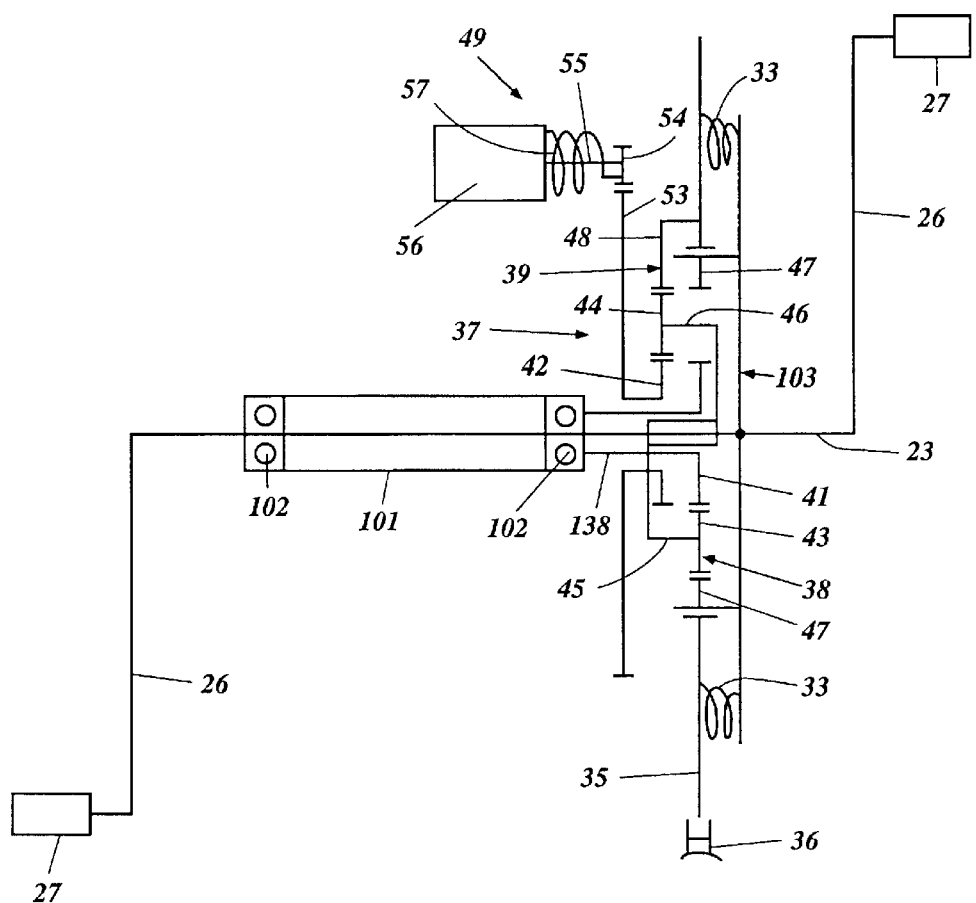
FIG. 3 is a partial schematic cross-sectional view, in part similar to FIGS. 1 and 2, showing the driving arrangement and sensor mechanism in accordance with a third embodiment of the invention.
Figure 4:
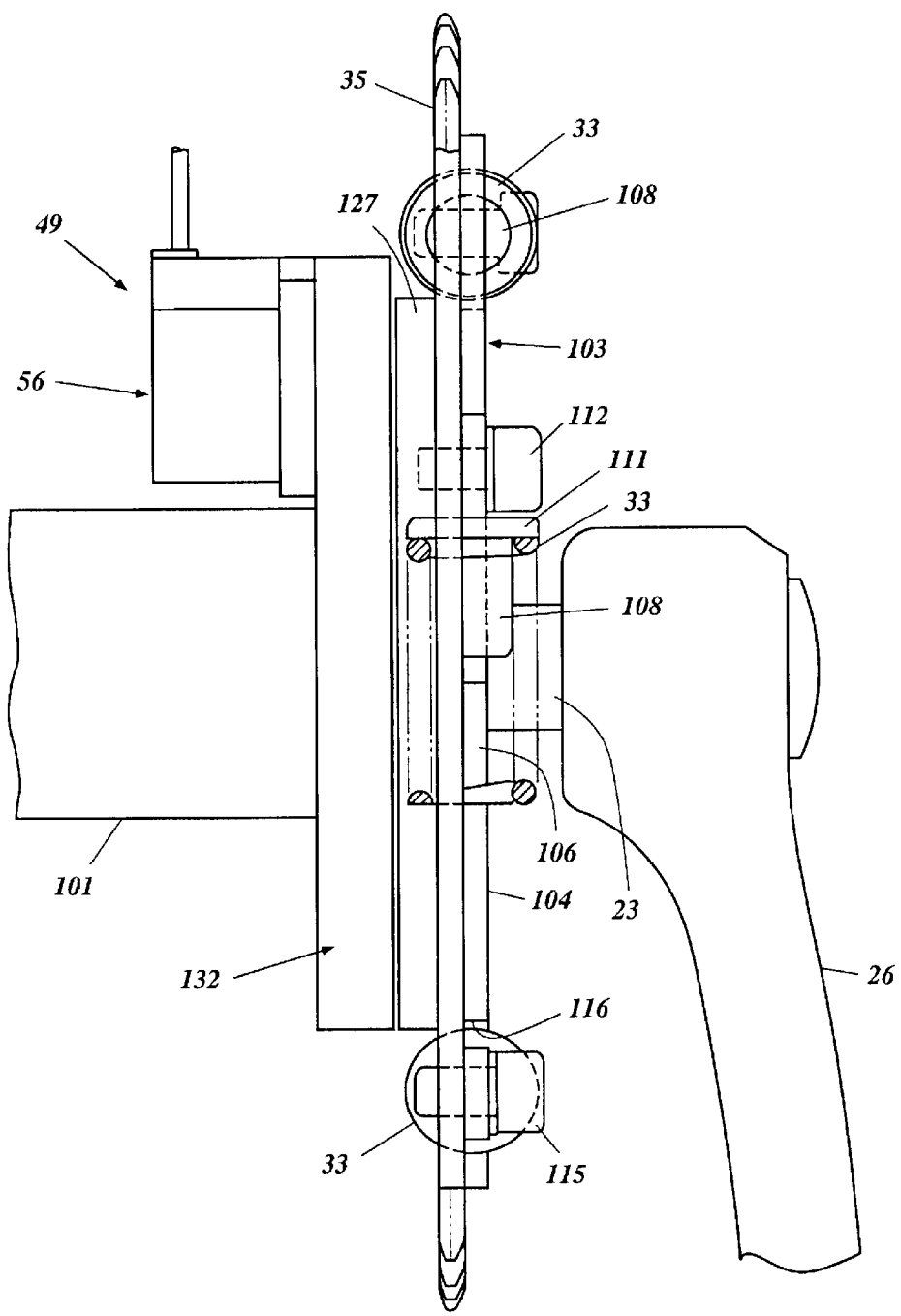
FIG. 4 is a view looking in the same general direction as FIG. 3 but showing the actual physical construction of the drive mechanism and force sensor.
Figure 5:
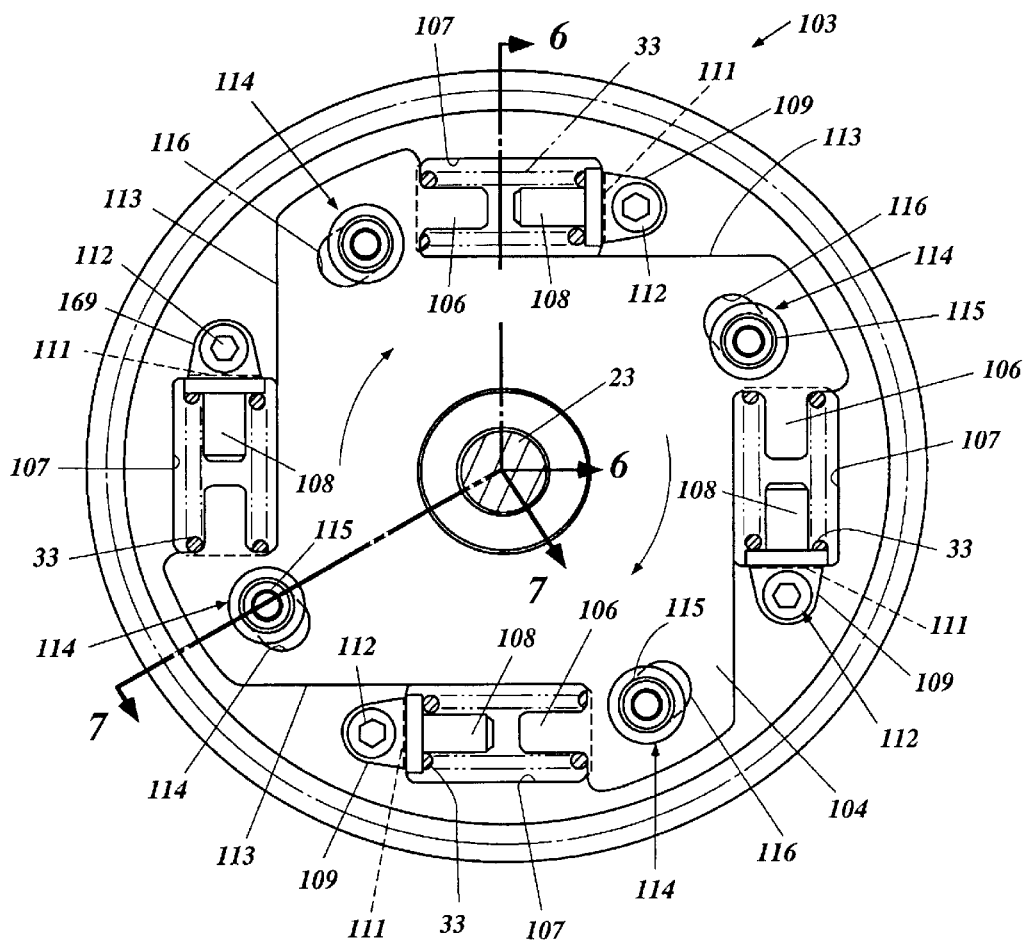
FIG. 5 is a cross-sectional view taken along a plane perpendicular to the plane of FIG. 4 and shows the construction of the driving sprocket and associated force sensor mechanism.

This embodiment will now be described in detail by reference to these figures and beginning with FIG. 3 wherein the components are shown schematically. As has been previously noted, where the components have the same function but not necessarily the same physical orientation, they have been identified by the same reference numerals so as to facilitate the understanding of the invention.

In this embodiment, the crankshaft 23 is supported within a tubular member 101 which can be fixed to or form a part of the bicycle frame assembly or the frame assembly of the associated vehicle if it is other than a bicycle. The way this is done will be described later, primarily by reference to FIG. 10.

This tube 101 has a pair of axially spaced bearings 102 that journal the crankshaft 23. In this embodiment, the driving sprocket 35 is driven by a disc-shaped member 103 that is fixed to the crankshaft 23 at one side of the vehicle frame. This relationship between the sprocket 35 and the disk shaped member 103 incorporates a lost motion connection which will be described in more detail later by more reference to FIGS. 4–7. However, this lost motion connection includes biasing springs 33 which serve the same function as the springs of the same number in the previously described embodiment.

Again, a differential planetary transmission, indicated by the reference numeral 37 is provided for operating the sensor 49. As previously described, the differential transmission 37 includes a first planetary transmission 38 which is driven by the crankshaft 23 and thus includes a sun gear 41 that cooperates with planet gears 43 carried by a carrier 45 and which are engaged in their outer peripheral edges with a ring gear 47. In this embodiment, the sun gear 41 rather than the carrier 45 is fixed against rotation by means of a connection to the frame assembly provided by a member that is shown schematically in FIG. 3 and will be described later in more detail when referring to FIGS. 4–7.

The second planetary transmission 39 is associated with the driving sprocket 35. To this end, its ring gear 48 is affixed for rotation with the sprocket 35 in a manner which will become apparent later by reference to the remaining figures of this embodiment. The planet gears 44 of this transmission are engaged with the ring gear 48 and their carrier 46 is connected to and forms a part of the carrier 45 of the first planetary transmission 38. Hence, the carriers of both transmissions are coupled together rather than the ring gears as in the previous two embodiments.

The sun gear 42 of the second planetary transmission has affixed to it a drive gear 53 which meshes with a sensor drive gear 54. Like the previous embodiments, the ratios between the gears of the two planetary transmissions 38 and 39 are the same. Again, the biasing spring 57 associated with the sensor mechanism 49 will take up lash in the planetary transmission mechanisms 38 and 39 and avoid the need for any other backlash eliminating system. Also, the planetary transmissions 38 and 39 do not transmit the driving torque and hence can be made lightweight and of plastic or other low-cost materials.

Figure 6:
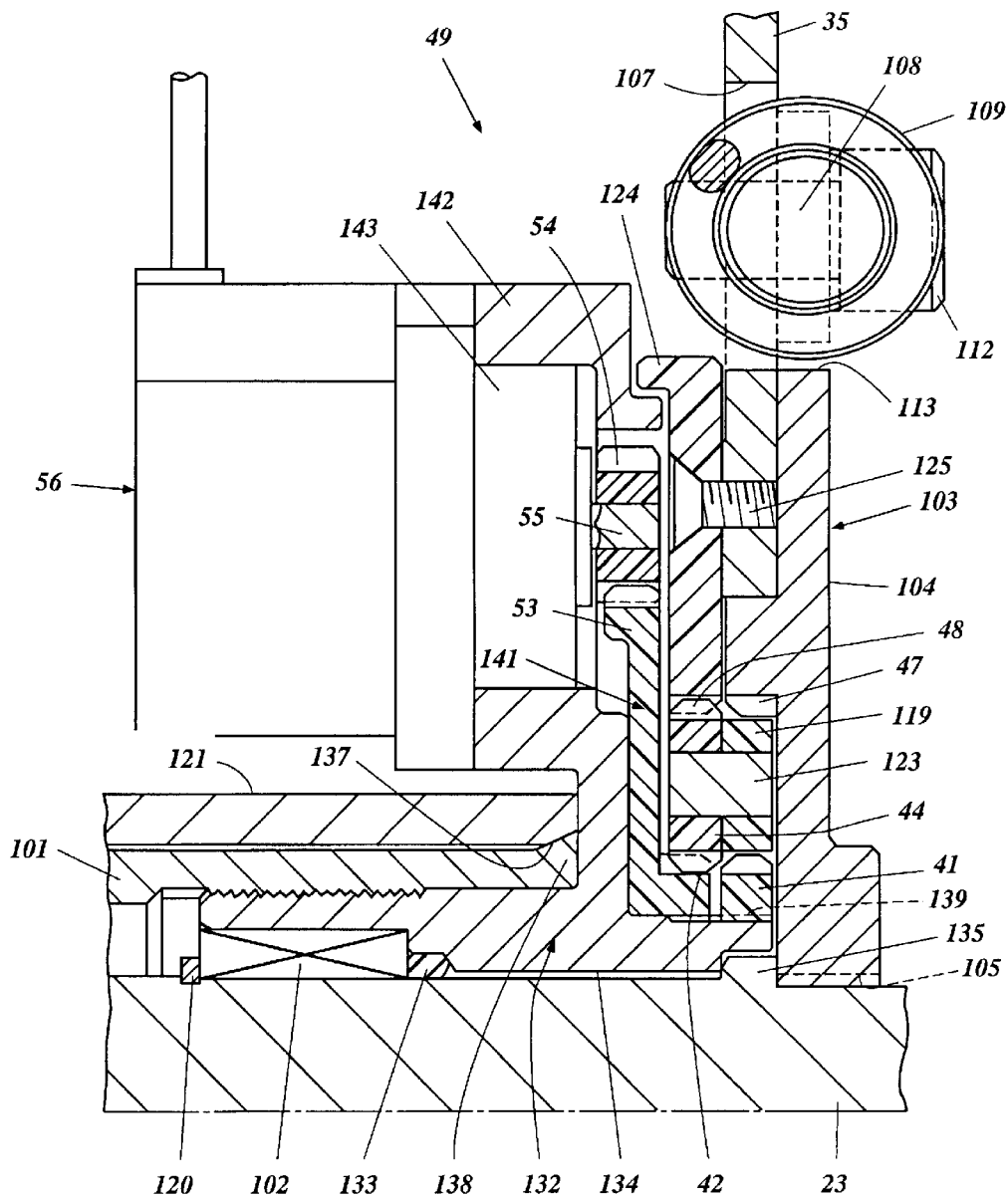
FIG. 6 is an enlarged cross-sectional view taken along the line 6—6 of FIG. 5 and shows a portion of the transmission for the torque sensor.

The actual physical construction of this embodiment will now be described by primary reference to FIGS. 4–10 as will be manner in which the construction can be assembled onto the associated vehicle. The resilient driving connection between the disk shaped member 103 associated with the crankshaft 23 and the driving sprocket 35 will be described first by primary reference to FIGS. 4–7. It should be seen that a semi disc-shaped member 104 is provided that has a spline connection 105 to the crankshaft as seen in FIG. 6. This member 104 provides circumferentially spaced portions which define posts 106 around which the biasing springs 33 are telescopically received.

These springs 33 also extend into cutout slots 107 that are formed in the periphery of the sprocket 35. The opposite ends of the springs 33 are received on additional posts 108 of mounting lugs 109 that have shoulder portions 111 that are engaged with the ends of the slots 107 in the driving sprocket 35. Because of this engagement, it is possible to hold these lugs 109 and their associated post 108 on the driving sprocket 35 by relatively light threaded fasteners 112. These threaded fasteners 112 do not absorb the driving torque because that is absorbed between the shoulders 111 and the mounting lugs 109. It should be seen that the distance between the posts 106 and 108 delimits the degree of relative rotation that can occur in this lost motion connection with is thus formed.

It should also be noted that the member 104 has flattened portions 113 which extend parallel to and are spaced inwardly from their posts 106 so as to further provide confinement for the springs 33.

Retaining assemblies, indicated generally by the reference numeral 114 are provided for maintaining the axial spacing between the member 104 and the driving sprocket 35 without interfering with the relative rotation provided by the lost motion connections as thus far described. This retaining structure 114 appears best in FIGS. 5 and 7.

It will be seen that the driving sprocket 35 has tapped openings that receive the threaded portions of socket-headed screws 115. These socket-headed screws 115 have portions that extend through arcuate slots 116 formed in the member 104. Washers 117 limit the axial movement between the sprocket 35 and the member 104. Antifriction members 118 are received around the threaded portion of the fasteners 115 and extend into the slots 116 so as to maintain the axial spacing while permitting the free relative rotation.

Figure 7:
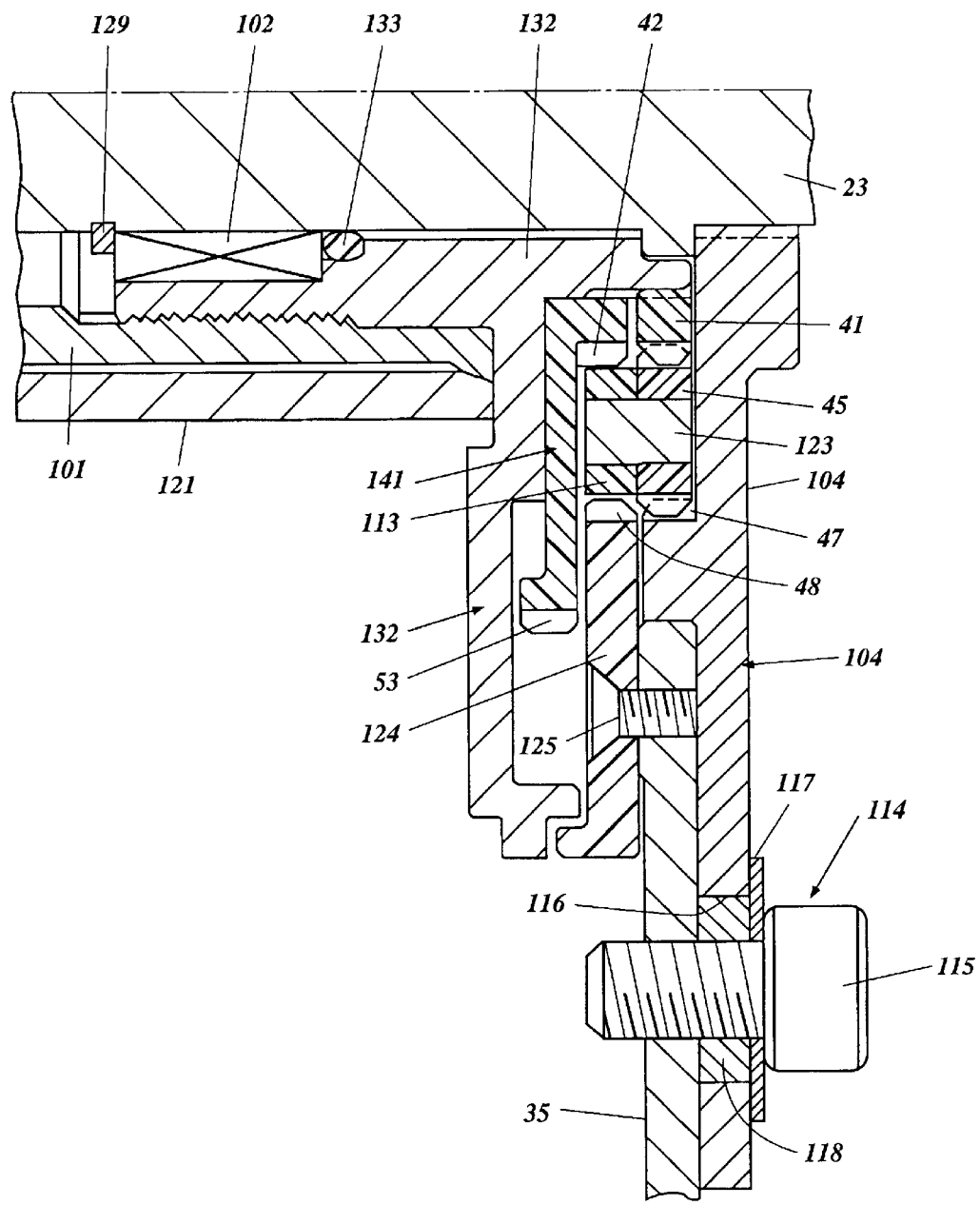
FIG. 7 is an enlarged cross-sectional view taken along the line 7—7 of FIG. 5 showing another portion of this transmission.
Figure 8:
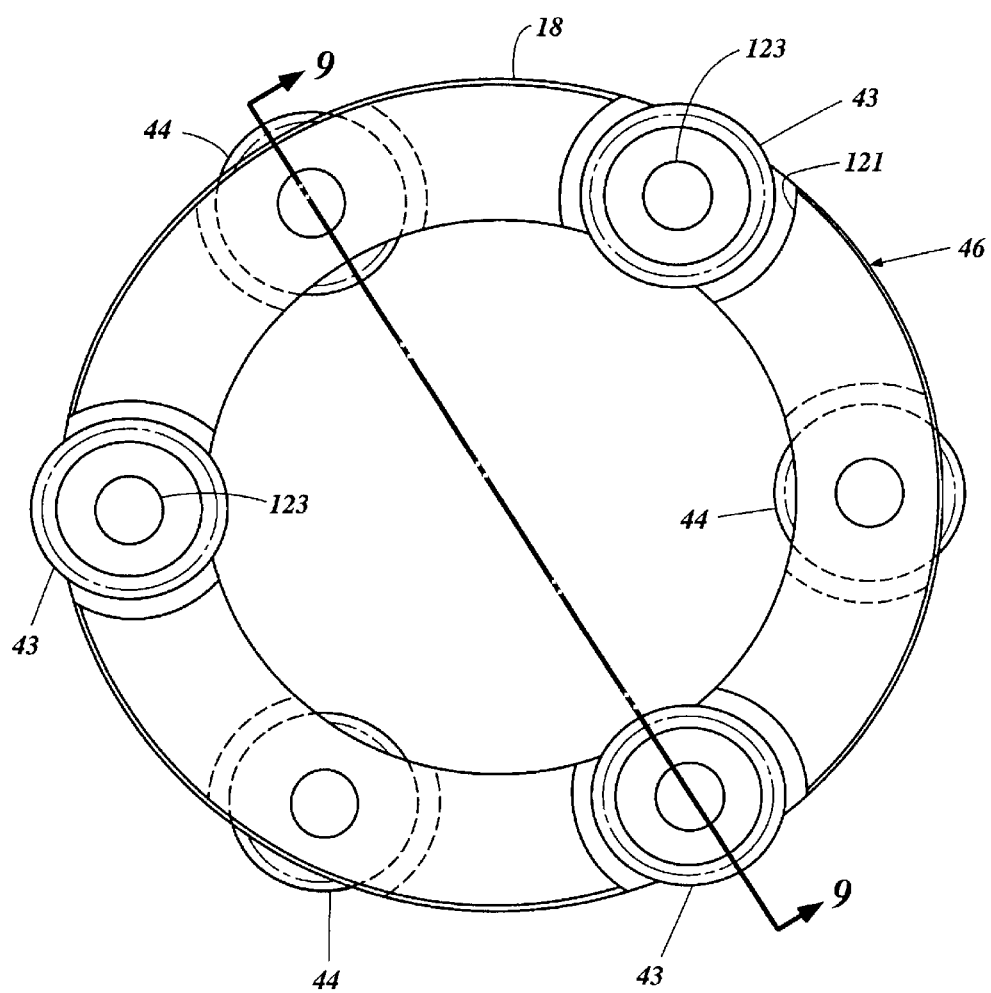
FIG. 8 is a side elevational view showing the carrier and planet gears associated with the torque sensor of this embodiment.
Figure 9:
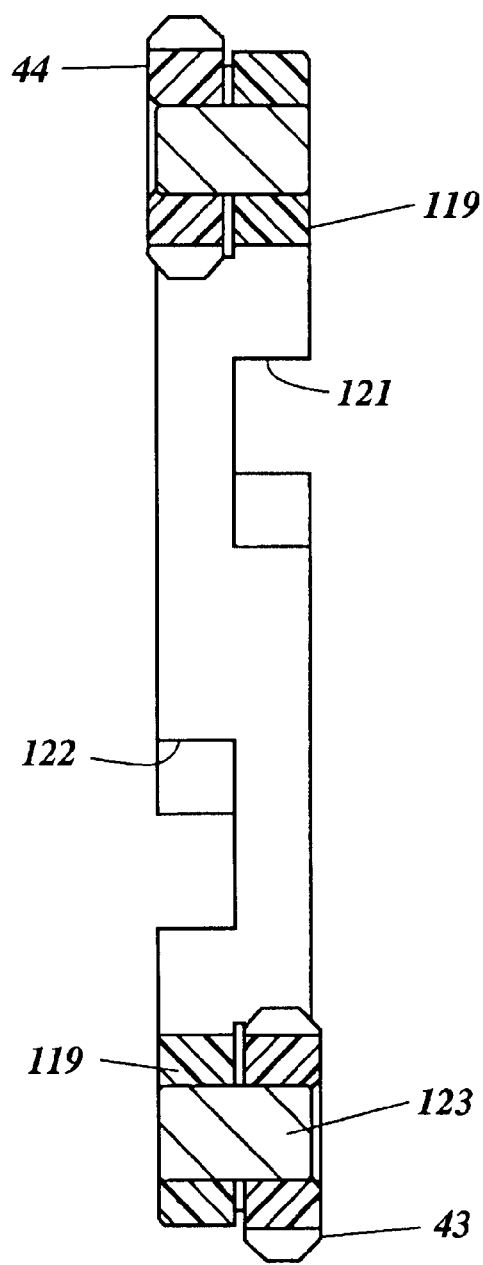
FIG. 9 is a cross-sectional view taken along the line 9—9 of FIG. 8.
Figure 10:
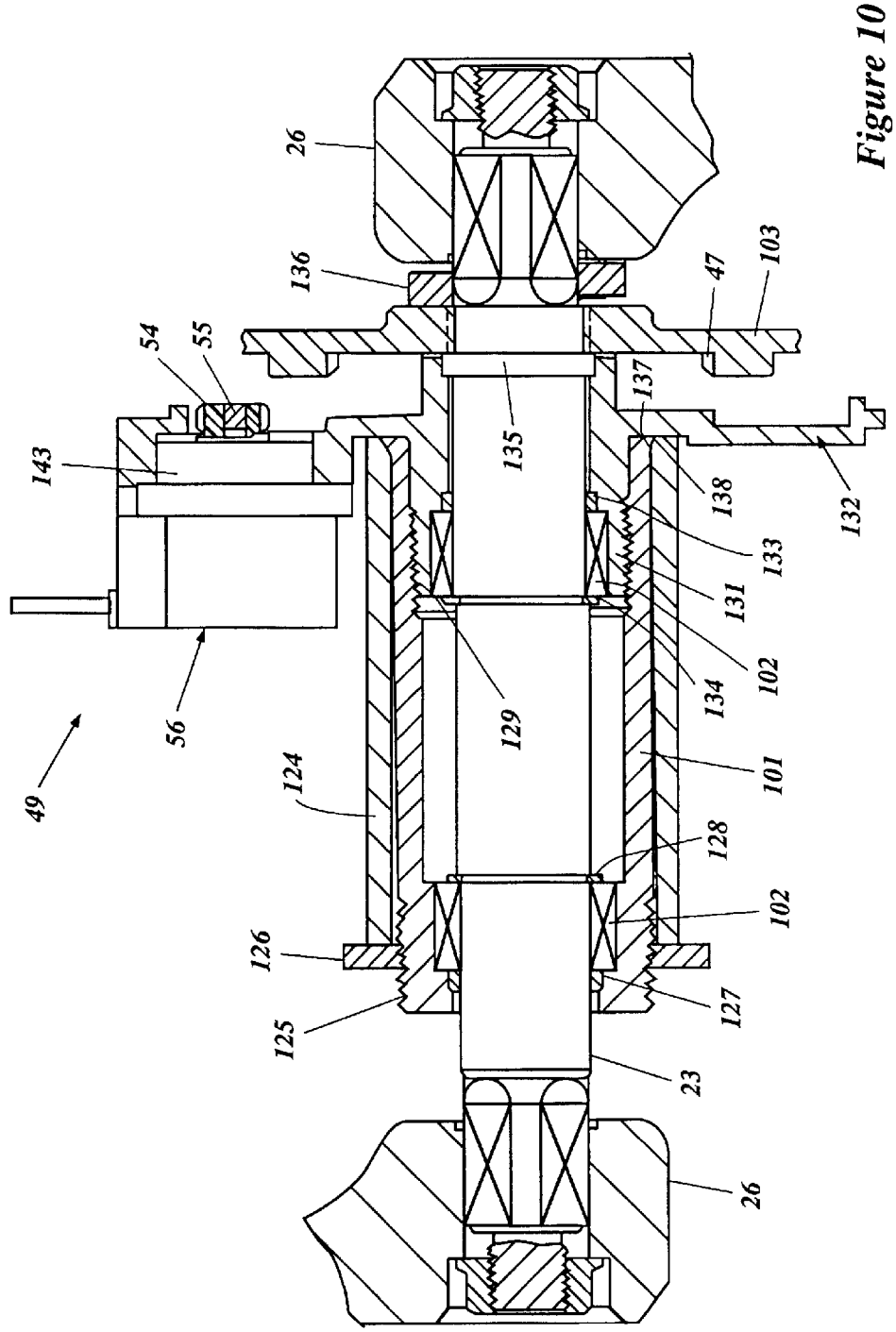
FIG. 10 is a cross-sectional view showing the mounting of the crank mechanism in the vehicle and the associated mounting of the torque sensing element.

The construction of the actual differential transmission 37 and its relationship to the elements thus far described will now be described in detail by primary reference to FIGS. 6–9. Referring first to FIGS. 6 and 7, it has already been noted that the ring gear 47 of the first planetary transmission 38 is formed integrally with the driving element 103 and specifically the member 104 which forms it. This construction is best shown in FIGS. 6 and 7 wherein this integral construction appears.

As has been noted, the ring gear 47 meshes with the planet gears 43 and these share a common carrier with the planet gears 44 of the second planetary transmission 39. This common carrier construction appears best in FIG. 8 and 9 and these figures also show how this construction can be made very inexpensively and also very compactly.

The carrier member 46 is comprised of a plastic annular disc, indicated generally by the reference number 119 that has notched openings 121 and 122 formed around its circumference and on opposite sides thereof. The notches 121 accommodate the planet gears 43 that are mounted on pins 123 that are embedded in the member 119. These planet gears 43 thus are free to maintain in meshing relationship with the ring gear 47 of this first planetary transmission 38.

Within the notched openings 122 are positioned the planet gears 44 of the second planetary transmission 39. Like the planet gears 43, the planet gears 44 are supported on pins 123 that are pressed into the carrier member 119. Thus, it should be readily apparent that this common carrier for the planet gears 43 and 44 of the two planetary transmissions 38 and 39 can be made very simple, compact, and low in cost.

It has been noted that the ring gear 48 of the second planetary transmission 39 is fixed for rotation with the driving sprocket 35. This actual physical construction will now be described by primary reference to FIGS. 6 and 7. As may be seen in these figures, the ring gear 48 is formed as a part of a plastic annular member 124 which is affixed to the driving sprocket 35 by a plurality of threaded fasteners 125. This ring gear 48 is, as clearly shown in these figures, juxtaposed to the ring gear 47 of the first planetary transmission 38.

Before describing the actual physical construction of the two sun gears 41 and 42 of the planetary transmissions 38 and 39 and their relation to the remaining components, it is believed desirable to describe how the actual physical structure is mounted in the associated vehicle. This will now be done with reference to FIGS. 6, 7, and 10. As previously noted, the structure is mounted within a tube 101 that carries the bearings 102. This physical structure appears in these figures.

It will be seen that the tube 101 is conveniently mounted within a tubular element 126 of the frame of the associated vehicle. The tubular member 101 has, at the side opposite to that where the transmission and final drive mechanism is, a threaded end portion 125 that receives a threaded fastener 126 so as to fix this end relative to the frame tube 124. The bearing at the side 102 is located therein and an oil seal 127 is disposed outwardly of this bearing. A snap ring 128 provides axial positioning of the bearing 102 in the tubular member 101.

At the opposite side, the tubular member 101 is formed with a female threaded opening 129 into which a male threaded end 131 of a support plate 132 is threaded. An oil seal 133 and snap ring 134 hold the bearing 102 at this side in place. The support plate 132 has a bore 130 that clears the outer periphery of the crankshaft 23 in this area and a lug 135 formed on the crankshaft 23 provides axial location of the crankshaft and associated assembly in the bicycle frame. This entire assembly is then held in place by a fastener 136 that holds the driving member 103 axially in position on the crankshaft 23.

The frame tube 123 has a tapered shoulder 137 that is engaged by a corresponding tapered surface 138 formed on the tubular member 101 so as to provide a snug fit and location for these elements.

Returning now primarily to FIGS. 6 and 7, the relationship of the two sun gears 41 and 42 will be described. First, the sun gear 41 of the first planetary transmission 38 is received on a splined or keyed portion of the support plate 132, this being indicated by the reference numeral 139. Adjacent to this and captured therebetween is a sensor driving element, indicated generally by the reference numeral 141. This driving element 141 is formed integrally at one end thereof the sun gear 42 of the second planetary transmission 39. The outer peripheral edge of this member 141 is formed with the drive gear 53 for driving the driven gear 54 associated with the potentiometer shaft 55 of the sensor 49.

For ease of mounting, the support plate 132 can be formed with a boss 142 (FIG. 6) into which a pilot portion 143 of the sensor housing 56 extends so as to hold it in place and to form a neat and compact assembly. In addition, this assembly can be very easily and simply fabricated and assembled to an existing vehicle frame.

Embodiment of FIGS. 11–15

FIGS. 11–15 show another embodiment which, like the second and third embodiments of FIG. 2 and FIGS. 3–10 have in common the use of the differential planetary transmission, which is also common to the embodiment of FIG. 1. In these later embodiments, however, the electric motor 51 assist drives a wheel other than that driven by the manually operated crank mechanism.

The manual drive transmission and the torque sensing arrangement of this embodiment is identified generally by the reference numeral 201. For the reasons already described, where components of this embodiment are the same or substantially the same as those embodiments previously described, their components will be identified by the same reference numeral. These components will be described again only insofar as necessary to understand the construction and operation of this embodiment. Also, this embodiment has much in common with the embodiment of FIGS. 3–10 in that the differential planetary transmission assembly, again indicated generally by the reference numeral 37 is mounted at one side of the frame of the vehicle and outside thereof.

Also, in this embodiment, the lost motion connection for providing the torque sensing characteristics is provided in the drive for the sprocket 35 and via a driving member, indicated generally by the reference numeral 202 that is associated with it by means of a lost motion connection as will be described.

Before describing the specific construction, the way in which the components of the differential transmission 37 are associated with the torque sensor 49 will be described first by reference to the schematic figure, FIG. 11. The detailed description of the actual physical construction will be described after that by particular reference to FIGS. 12–15. The mounting arrangement for the crankshaft 23 and this embodiment is indicated generally by the reference numeral 203 and it will also be described later.

In this embodiment, the first planetary transmission 38 which is associated with the crankshaft 23 is disposed inboard of the second planetary transmission 39 which is associated with the driven shaft or specifically the sprocket 35. The sun gear 41 of the first planetary transmission 38 is journaled by a bearing assembly 204 that is journaled on the crankshaft 23 and hence the sun gear 41 in this embodiment is rotatable. The planet gears 43 and their carrier 45 are rotatable about the crankshaft 23 also. The ring gear 47 of this transmission is, however, affixed to the bicycle frame in a manner which will be described and hence does not rotate.

Figure 11:
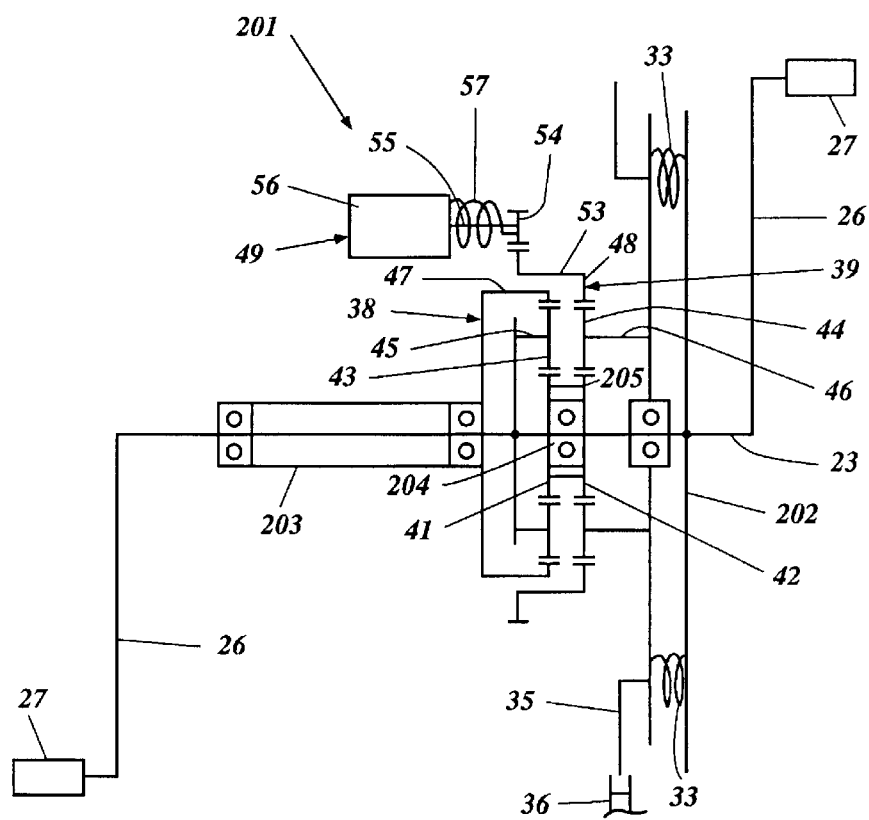
FIG. 11 is a partially schematic cross-sectional view, in part similar to FIGS. 1, 2 and 3 and shows a fourth embodiment of the invention.

The sun gear 42 of the second planetary transmission 39 is journaled for rotation relative to the crankshaft 23 and is affixed, as shown schematically at 205 in FIG. 11 for rotation with the sun gear 41 of the first planetary transmission. The planet gears 44 of the second planetary transmission 49 and their carrier 46 is affixed for rotation with the driving sprocket 35 of the final drive in a manner which will be described. The ring gear 48 of this second planetary transmission is coupled to the sensor drive gear 53. Hence, when the relative rotation occurs, the ring gear 48 of the second planetary transmission 39 will be the output member for driving the sensor assembly 49.

Again, and as in all of the embodiments described up to this point, the corresponding gears of each of the planetary transmissions 38 and 39 all have the same diameter and number of teeth.

Figure 12:
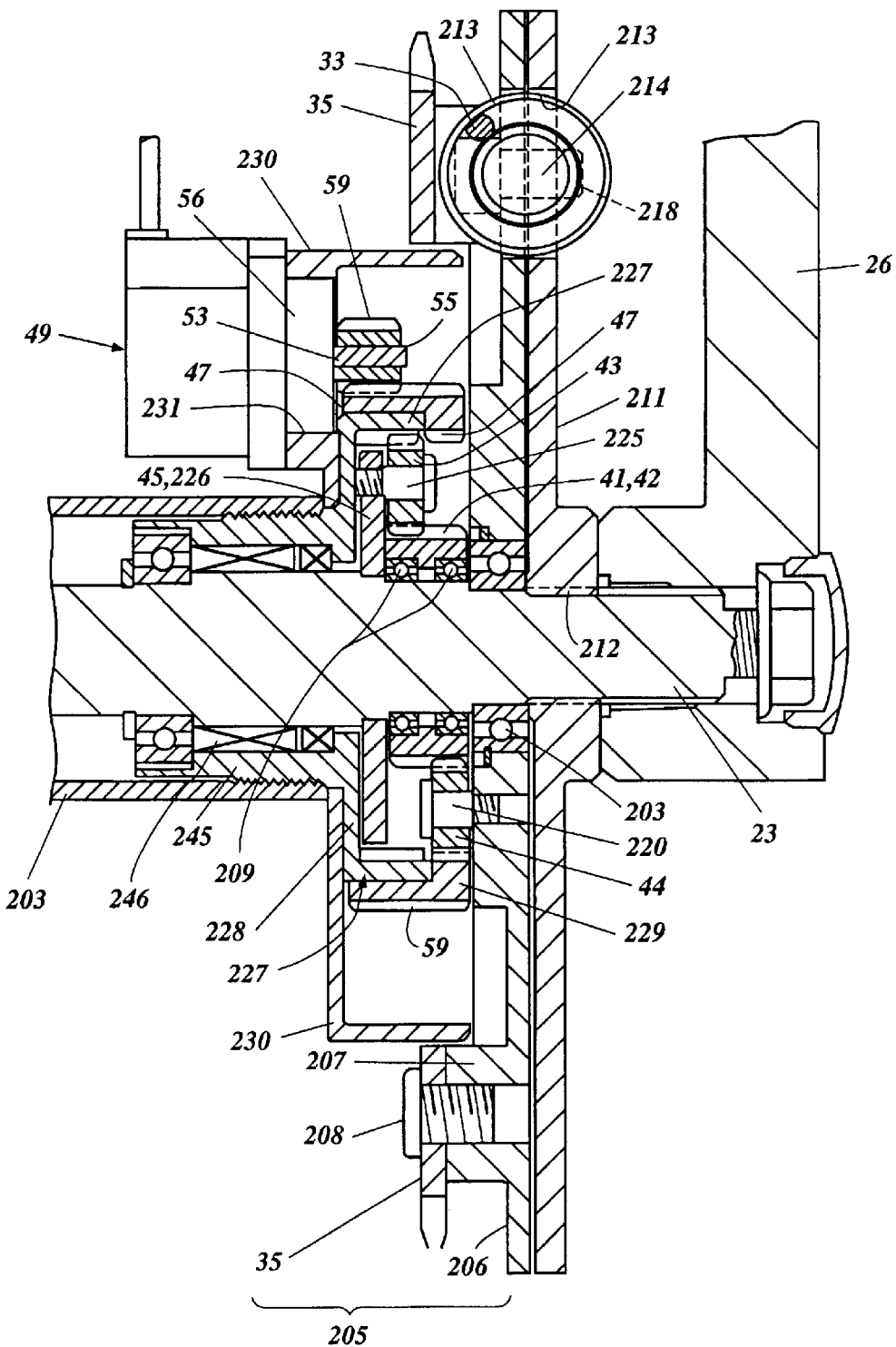
FIG. 12 is an enlarged cross-sectional view looking generally in the same direction as FIG. 11 but shows the actual physical construction of the mechanism of the fourth embodiment and is taken generally along the line 12—12 of FIG. 13.
Figure 13:
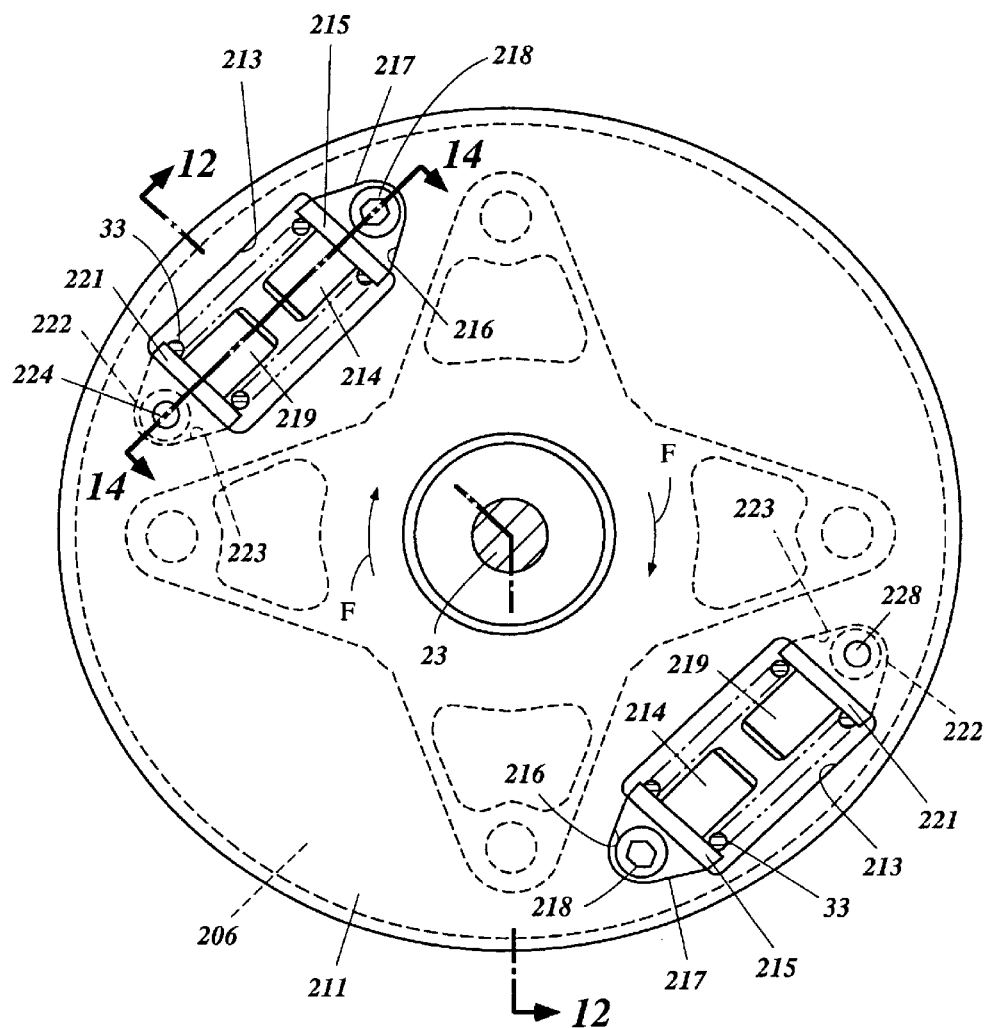
FIG. 13 is a view looking in a direction perpendicular to that of FIG. 12 and shows the details of the lost motion connection in the driving sprocket relationship.
Figure 14:
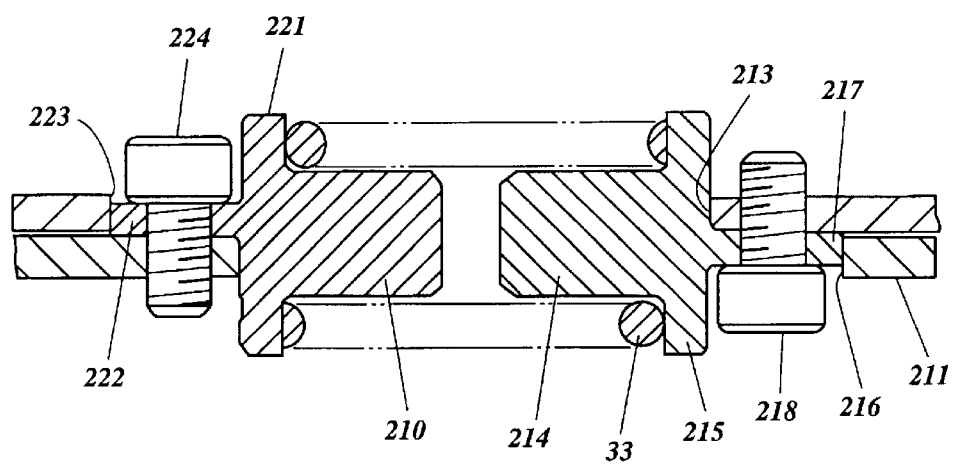
FIG. 14 is an enlarged cross-sectional view taken through one of the elastic damping mechanisms providing in the lost motion connection of this embodiment.

Referring now in detail to the specific construction by reference to FIGS. 12–15 and initially to the construction of the lost motion connection between the crankshaft 23 and the driving sprocket 35, this structure is shown in most detail in FIGS. 12–14. It will be seen that the driving sprocket 35 is affixed to and thus forms a portion of a driving assembly 205 which is comprised primarily of a disc-shaped member 206 having projections 207 to which the sprocket 35 is fixed by threaded fasteners 208.

This disc-shaped member 206 is journaled on the crankshaft 23 by means of a ball bearing assembly 209. A second disc 211 is juxtaposed to the disc 206 and has a splined connection, as at 212 to the crankshaft 23.

These two discs 206 and 211 have a pair of adjacent windowed openings 213 formed at equal circumferential distances from the axis of rotation of the crankshaft 23. The elastic springs 33 are disposed within these windowed openings 213. The elastic springs 33 are received at one end on posts 214 of a supporting lug 215 which is engaged with the surface of the disc 211 that is adjacent this opening 213. This provides a metal-to-metal contact. This disc is also formed with a recess 216 in which the base portion 217 of the lug 215 is received so as to provide a steady rest position. Thus, a fastening bolt 218 that holds the lug 215 in place need not take the compressive forces and merely maintain the lug 215 in its radial position.

A similar post 219 supports the other end of the spring 33 and is affixed to the disc 206. The post 219 is formed to extend from a base portion 221 which is engaged with the surface of the opening 213 in the disc 206. A lug portion 222 thereof also is received in a corresponding recess 223 formed in the disc member 206 so as to take the axial forces. A threaded fastener 224 maintains these other lugs in position. Thus, the spring assembly is quite effective in controlling and resisting the relative circumferential movement. In addition, the ends of the posts 214 and 219 can contact each other to provide a positive stop to limit the maximum degree of circumferential movement.

Figure 15:
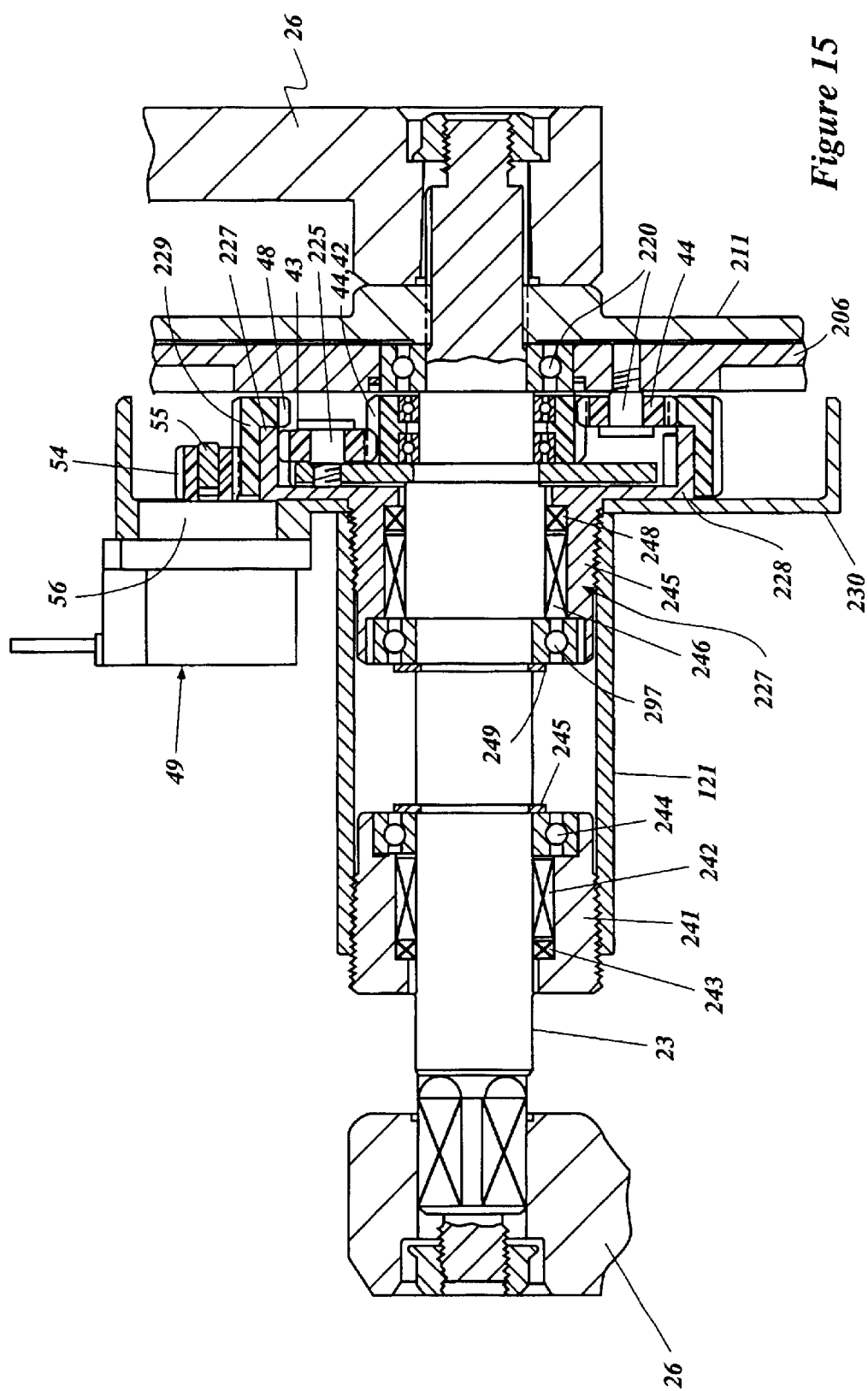
FIG. 15 is a view looking in generally the same direction as FIG. 12 but shows the mounting of the force sensor on the associated vehicle.

The actual physical construction of the planetary transmissions 38 and 39 make up the differential transmission 37 will now be described by particular reference to FIGS. 12 and 15. It has already been noted that the sun gears 41 and 42 of the two planetary transmissions 38 and 39 are formed by a common member that is supported on the crankshaft 23 by bearings 204. As with the previously described embodiments, this common member may be conveniently formed from a suitable plastic or other lightweight, low cost material.

The planet gears 43 of the first planetary transmission 38 are mounted on pins 225 which are threaded into a carrier plate 226 which constitutes the carrier indicated generically by the reference numeral 45 in the preceding figures.

The planet gears 44 of the second planetary transmission 39 are journalled on pins 220 threaded into the disc 206 and hence this disc 206 functions as the carrier previously indicated by the reference numeral 44 in the generic constructions. Thus, and as has already been noted, the second planetary transmission 39 receives its driving input from the driving sprocket 35 or drive shaft component of the transmission in this embodiment.

The ring gear 47 of the first planetary transmission 38 is formed by a retainer member, indicated generally by the reference numeral 227 and which has a threaded engagement with the supporting tube 23 which will be described shortly. A radially inwardly extending portion 228 of this retainer and ring gear forming member 227 extends adjacent a generally cup-shaped housing member 230 of the assembly. Thus, the ring gear 47 formed by the member 227 is held against rotation.

The ring gear 48 of the second planetary transmission 39, which forms the output member from the differential transmission, is formed by a sleeve-like member 229 which is journaled on the outer peripheral portion of the flange of the retainer member 227. This member 229 forms on its outer periphery the driving gear 53 for driving the driving gear 54 affixed to the potentiometer shaft 55 of the sensor 49. Like the previously described embodiment, the housing 56 of the potentiometer 49 is received in a suitable opening 231 formed by the mounting member 227. Thus, the differential motion transmitted to the sensor will be as with the previously described embodiments.

The bearing support for the crankshaft 23 and the final assembly of the construction will now be described by reference to FIG. 15. It will be seen in this figure that the bicycle or associated vehicle has a frame tube 121 like the previous embodiment. This frame tube is threaded at each end. At the end opposite that where the differential transmission mechanism 38 is located, a first closure member 241 is threaded into one end of this frame tube 101 and receives a first end support bearing 242 in which the adjacent end of the crankshaft 23 is journaled. A seal 243 is formed at one end of the roller bearings 242 and a ball bearing 244 is supported at the other end thereof. A snap ring 245 provides axial location of the shaft 23 relative to this bearing assembly.

At the opposite end, the mounting member 227 has a threaded portion 245 that is received in a threaded opening of the frame tube 101. A roller bearing 246 and ball bearing 247 support this end of the shaft for rotation. A seal 248 at one end and a snap ring 249 for retaining the assembly in place is provided at the other end. Thus, this embodiment also provides a very low cost assembly and one which can be conveniently fit into a conventional vehicle frame without significant modification. Also, the transmission is such that various mounting arrangements and location of the components are possible.

In all of the embodiments as thus far described, the axes of each of the planetary transmissions 38 and 39 and specifically their sun gears, the carriers and the ring gears has been coincident with the axis of rotation of the crankshaft 23. Although such an arrangement has advantages in simplicity, it does somewhat limit the possibilities of placement of the various components of the differential transmission and also to some extend limits the ratio between the input signal and the output signal.

Next will be described several embodiments that show arrangements wherein the planetary transmissions 38 and 39 of the differential transmission assembly 37 are displaced from the rotational axis of the crankshaft 23. In all of these embodiments, the rotational axes of the planetary transmissions 38 and 39 are parallel to the rotational axis of the crankshaft 23, but are offset from it.

Figure 16:
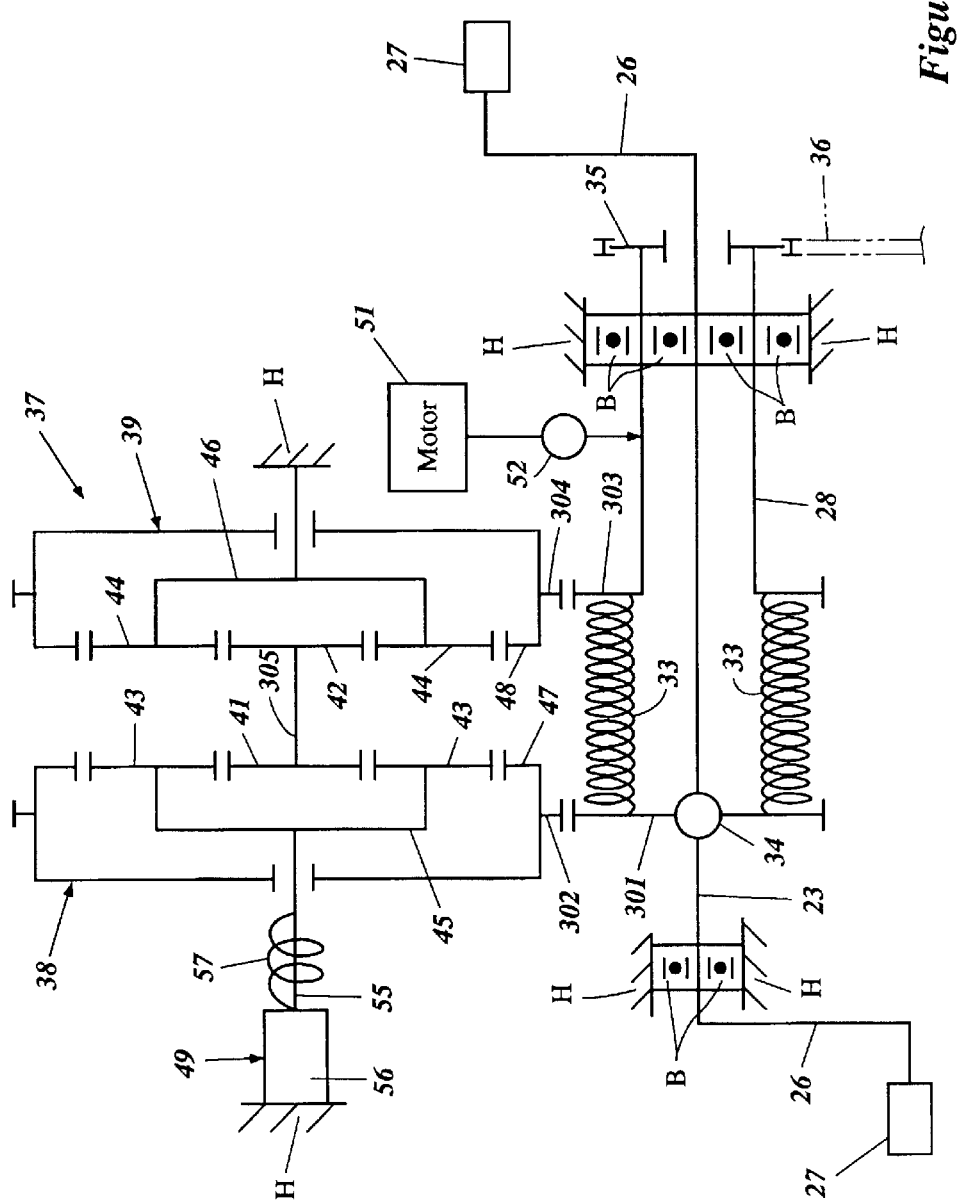
FIG. 16 is a partially schematic cross-sectional view, in part similar to FIGS. 1, 2, 3 and 11 and shows a fifth embodiment of the invention.

The first of these embodiments is shown in FIG. 16 and this is similar to the embodiment of FIG. 1 wherein the electric motor assist drives the driving gear directly of the same wheel that is driven by the manual power. Of course, however, the invention of this and the subsequent embodiments to be described can also be utilized in embodiments like that of FIG. 2 and FIGS. 3–10 and 11–15 wherein the manual power is applied to one wheel and the electric motor assist is applied to the another wheel.

Since the components of this embodiment are the same as that of the embodiment of FIG. 1 except for their orientation, all components of this embodiment have been identified by the same reference numerals as applied to the previously described embodiment. For this same reason, where those components are the same and function substantially the same except for their orientation, they will be described again only in so far as is necessary to understand the construction and operation of this embodiment.

In this embodiment, the crankshaft 23 is coupled via the one-way clutch 34 to a first gear 301 which gear provides a driving input to the first planetary transmission 38. In this arrangement, the ring gear 47 of this first planetary transmission 38 has an outer driven gear 302 that is driven by the gear 301 so as to provide the input to the planetary transmission 38. Like the previously described embodiments, the gears in this transmission are the same size and have the same number of teeth as the corresponding elements of the second planetary transmission 39.

As with certain of the earlier embodiments, the electric motor 51 drives the driving shaft 28 to which the sprocket 35 is directly affixed via a one-way clutch 52. The driving shaft 28 carriers a second driving gear 303 that is enmeshed with a gear 304 that provides the input signal to the second planetary transmission 39. Like the drive for the first planetary transmission 38, the gear 304 is affixed to the ring gear 48 of the second planetary transmission 39.

The ring gears 47 and 48 of the first and second planetary transmissions 38 and 39 are enmeshed with and drive the planet gears 43 and 44, respectively. The carrier 45 of the first planetary transmission 38 is affixed directly to the potentiometer shaft 55 and thus, the rotation of this carrier with provide the input signal to the sensor 49.

Like the previous embodiments, these potentiometer shaft 55 has associated with it a torsional spring 57 that will provide not only a pre-load but will provide back lash take-up for the two planetary transmission 38 and 39.

The carrier 46 of the second planetary transmission 39 is affixed to a part of the vehicle frame, indicated at H, so as to cause the rotation of the planet gears 44 to drive the sun gear 41 of this transmission. The sun gear 42 is directly coupled to the sun gear 41 by a connecting shaft 305 so as to effect the differential drive of the carrier 45 to provide the input signal to the potentiometer 56 and torque sensor 49 in the manner already described.

Also, there is again provided the lost motion connection between the manually driven shaft 23 and the driving shaft 28. This lost motion connection is indicated as including the springs 33. This type of lost motion connection between the shafts is provided between the driving gears 301 and 303. Of course, other locations can be chosen.

As with all of the previously described embodiments, the planetary transmissions 38 and 39 transmits no real driving load between the pedals 27 and the vehicle wheel and hence, these transmissions can be made from very inexpensive light weight material such as a plastic.

In the description of the aforenoted embodiments, it should be readily apparent that the differential transmission mechanism made up of the two interrelated planetary gear seats can be used in a variety of arrangements wherein the two inputs from the crankshaft 23 and driven shaft 28 and the output to the sensor 49 can be varied. FIG. 17 is a graphical view showing some but not all of the possible combinations that can be utilized and also how the relationship between the input/output phase difference and the transmission to the sensor can be varied.

The table shown in FIG. 17 shows on the left side the member of the first planetary transmission 38 that is driven by the crankshaft 23. On the right side of the transmission schematics the member of the second planetary transmission 39 that is coupled to the driven shaft (Output) is designated. Finally the element of either planetary transmission that is coupled to the sensor shaft 55 is designated in the schematic view. The right side table indicates the resulting drive ratio to the sensor input shaft 55.

In the table, the symbol ST stands for the numbers of teeth of the sun gears 41 and 42, and RT stands for the numbers of teeth of the ring gears 47 and 48. The values of the increase ratio in the table are based on the assumption that the number ST of teeth of the sun gears 41 and 42 is 20, the number RT of teeth of the ring gears 47 and 48 is 60, and the number teeth of the planet gears 43 and 44 is 20. The increase ratio is the ratio of the rotation angle of the sensor shaft 55 relative to the phase difference between the pedal crankshaft 23 and the drive sprocket 35.

In the case the sun gears 41 and 42 are respectively connected to the pedal crankshaft 23 of the human power drive train and the drive sprocket 35, the constitutions shown in Ex. 1 and Ex. 2 in the FIG. 17 may be employed.

The layout example of Ex. 1 is constituted that the rotation angle sensor 49 is connected to the ring gear 47 of the first planetary gear transmission 38, the ring gear 48 of the second planetary gear transmission 39 is fixed so as not to rotate, and the carriers 45 and 46 are interconnected. When this constitution is employed, the increase ratio (output/phase difference) becomes 1/3, and the rotating direction of the ring gear 47 connected to the rotation angle sensor 49 is the same as the input side.

The Ex. 2 is a layout when the constitution of the first (FIG. 1) or second (FIG. 2) embodiment is employed, in which the carrier 45 of the first planetary gear transmission 38 is secured not to rotate, the carrier 46 of the second planetary gear transmission 39 is connected to the sensor 49, and the ring gears 47 and 48 are interconnected. When this constitution is employed, the increase ratio (output/phase difference) becomes 1/4, and the rotating direction of the ring gear 47 connected to the rotation angle sensor 49 is opposite to the rotating direction on the input side.

In the case the ring gears 47 and 48 are connected to the pedal crankshaft 23 of the human power drive train and the drive sprocket 35, the constitution shown in Ex. 3 and Ex. 4 may be employed.

The Ex. 3 is a layout when the constitution of the fifth embodiment (FIG. 16) is employed, in which the rotation angle detecting sensor 49 is connected to the carrier 45 of the first planetary gear transmission 38, the carrier 46 of the second planetary gear transmission 39 is secured not to rotate, and the ring gears 47 and 48 are interconnected. When this constitution is employed, the increase ratio (output/phase difference) becomes 3/4, and the rotating direction of the carrier 45 connected to the rotation angle sensor 49 is opposite to the rotating direction on the input side.

The Ex. 4 is a layout when the constitution of the third embodiment (FIGS. 3–10) is employed, in which the sun gear 41 of the first planetary gear transmission 38 is fixed not to rotate, the sensor 49 is connected to the sun gear 42 of the second planetary gear transmission 39, and the carriers 45 and 46 are interconnected. When this constitution is employed, the increase ratio becomes 3, and the rotating direction of the ring gear 47 connected to the rotation angle sensor 49 is the same as on the input side.

In the case the carriers 45 and 46 are connected to the pedal crankshaft 23 of the human power drive train and the output member, the constitutions shown in Ex. 5 and Ex. 6 may be employed. The Ex. 5 is a layout when the constitution of the fourth embodiment (FIGS. 11–15) is employed, in which the ring gear 47 of the first planetary gear transmission 38 is fixed not to rotate, the sensor 49 is connected to the ring gear 48 of the second planetary gear transmission 39, and the sun gears 41 and 42 are interconnected. When this constitution is employed, the increase ratio becomes 3/4, and the rotating direction of the ring gear 47 connected to the rotation angle sensor 49 is opposite to the rotating direction on the input side.

In the Ex. 6, the sensor 49 is connected to the sun gear 41 of the first planetary gear transmission 38, the sun gear 42 of the second planetary gear transmission 39 is fixed not to rotate, and the ring gears 47 and 48 are interconnected. When this constitution is employed, the increase ratio becomes 4, and the rotating direction of the sun gear 41 connected to the rotation angle detecting sensor 49 is opposite to the rotating direction on the input side.

In the layout examples Ex. 1 to Ex. 6, the component connecting the sensor 49 and the component for prohibiting the rotation may be replaced with the first planetary gear transmission 38 and the second planetary gear transmission 39. For example, in the case the layout of Ex. 1 is employed, it may be constituted that the sensor 49 is connected to the ring gear 48 of the second planetary gear transmission 39, and the ring gear 47 of the first planetary gear transmission 38 is fixed not to rotate.

In the case the constitution of Ex. 4 or Ex. 6 is employed, since the phase difference between components on the input side is increased and transmitted to the sensor 49, even if a rotation angle detecting sensor of a lower resolution is used, detection of the same accuracy as in other layout is possible. Therefore, a rotation angle detecting sensor 49 of a lower price can be used. This can further reduce the cost of the power unit.

Introduction to Additional Embodiments

In all of the embodiments of the invention as thus far described, the differential transmission that has been utilized to drive the phase change sensor to provide the indication of manual torque input has comprised a pair of interrelated planetary transmissions. Although such arrangements have advantages, it is also possible to utilize a somewhat simpler arrangement that only employs one planetary transmission.

With such arrangement, different elements of the planetary transmission are interrelated with the input crankshaft 23 and the driving shaft 28 and the remaining component of the planetary transmission is coupled to the sensor. By utilizing appropriate gear ratios, it is possible to achieve an arrangement wherein a difference in the rotational amounts of these two shafts can be transferred to a signal to the position sensor to provide this torque indication.

Three such embodiments will be described shortly by reference to FIGS. 18, 19, and 20, respectively. The driving relationship is generally the same as that shown in the embodiment of FIG. 16 insofar as the relationship between the crankshaft 23 and driving shaft 28 as well as the driven wheel of the vehicle are concerned. Therefore, the components of these three new embodiments (FIGS. 18, 19, and 20) will utilize the same reference numerals for these common components as were previously employed so as to facilitate the understanding.

In these embodiments, also, the electric motor assist is applied to the driving shaft 28 in the same manner as the embodiment of FIG. 16 so the numbers utilized for those components also will be the same. Finally, the torque sensor or angular position sensor 49 is the same and its components have been identified by the reference numerals previously applied.

Figure 18:
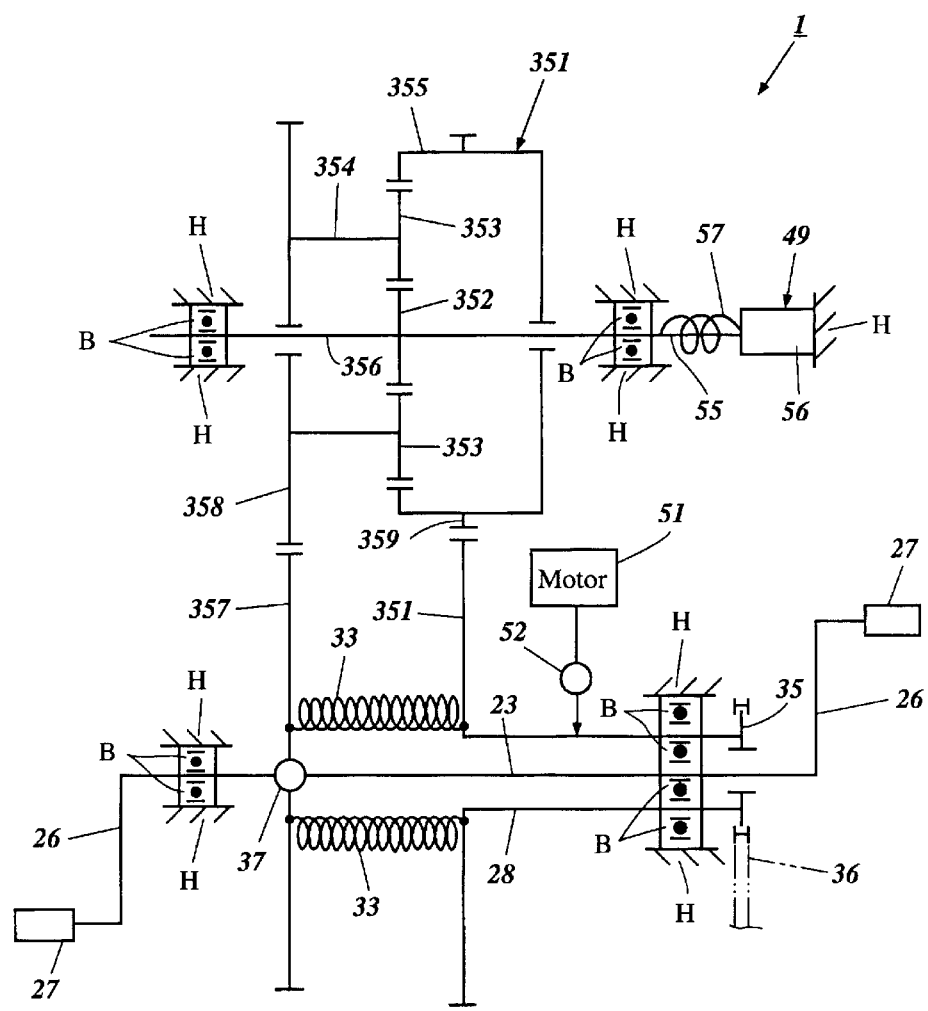
FIG. 18 is a partially schematic cross sectional view, in part similar to FIGS. 1, 2, 3, 11, and 16, and shows another embodiment of the invention.

Embodiment of FIG. 18

Figure 19:
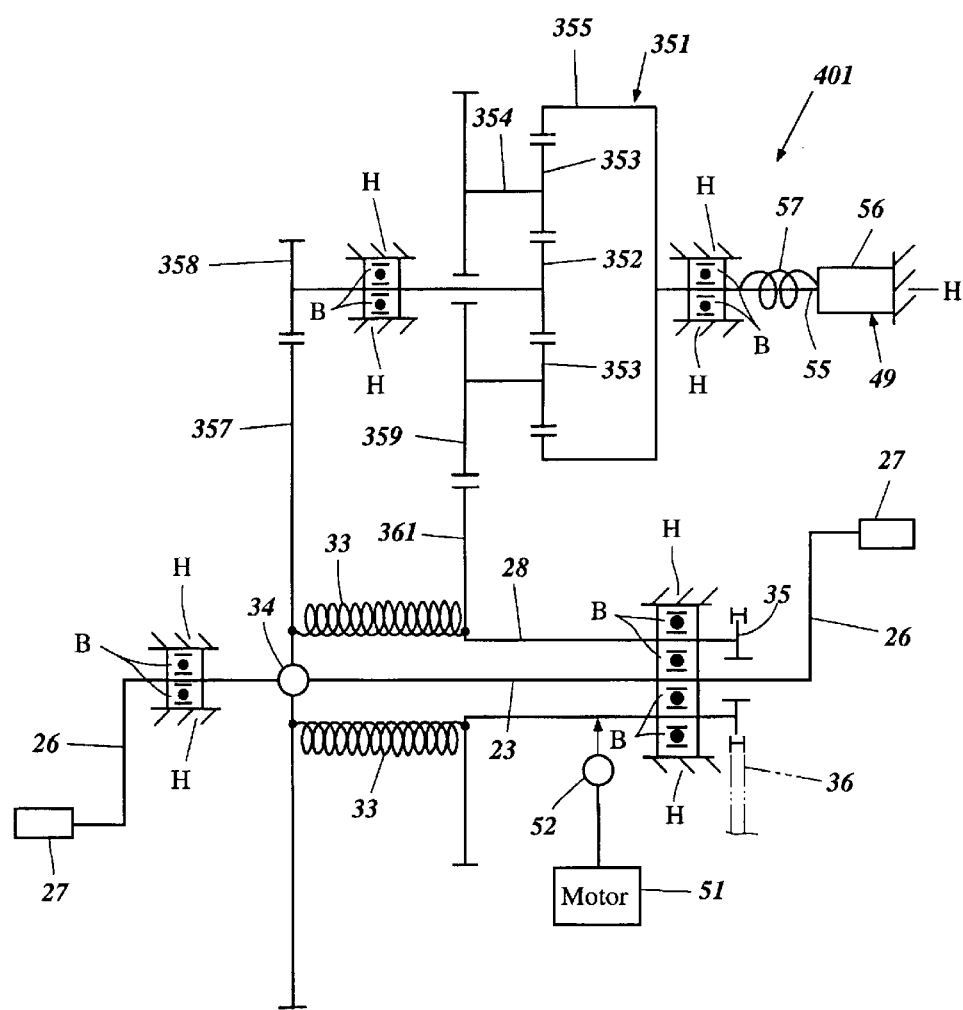
FIG. 19 is a partially schematic view, in part similar to FIGS. 1, 2, 3, 11, 16 and 17, and shows yet another embodiment of the invention.

In each of these three additional embodiments of FIGS. 18, 19, and 21, there is provided a differential planetary transmission, indicated generally by the reference numeral 351. In each instance, the differential planetary transmission 351 is comprised of a sun gear 352 which rotates about an axis that is parallel to but offset from the axes of the crankshaft 23 and driving shaft 28. The sun gear 38 meshes with planet gears 353 which are, in turn, carried by a carrier 354. Finally, a ring gear 355 is associated with the planet gears 353 and has an axis that is coincident with the axis of the sun gear 352, and carrier 354.

FIG. 18 shows an embodiment wherein the sun gear 352 is affixed to a common sensor output shaft 356 which is coupled in driving relationship to the sensor shaft 55. In this embodiment, the carrier 354 is driven with the crankshaft 23. Therefore, a crankshaft driving gear 357 is fixed to the output element of the one way clutch 354 and is enmeshed with a first driving gear 358 which, in this embodiment, is coupled to drive the carrier 354.

The ring gear 355 is formed on its exterior surface with a driven gear 359. This driven gear 359 is enmeshed with a driving gear 361 which is fixed for rotation with the driving shaft 28.

The ratios of the driving and driven gears 357 and 358 and 361 and 359 and the gears of the differential planetary transmissions 351 have a specific relationship so that there will occur rotation of the potentiometer shaft 55 when there is a difference in degree of rotation between the crankshaft 23 and the driving shaft 28. This relationship is set as follows in order to achieve this purpose.

The gears 357 and 358 interconnecting the pedal crankshaft 23 and the carrier 354 are formed with the same number of teeth (same diameter). The gears 361 and 359 interconnecting the driving shaft 28 and the ring gear 355 are formed with different numbers of teeth. Also, the numbers of teeth of the gears 361 and 359 are made different from the number of teeth of the gears 357 and 358.

If the numbers of teeth of the components of the planetary gear mechanism 351, and the numbers of teeth of the gears 357, 358, 361, and 359 are set so that the Equation (1) below is satisfied, the input shaft 55 of the rotation angle detecting sensor 49 is stationary when no difference in phase exists between the pedal crankshaft 23 and the driving shaft 28, and the input shaft 55 of the sensor 49 rotates when a difference in rotation phase occurs between the pedal crankshaft 23 and the driving shaft 28.

In the Equation (1) below, the numbers of teeth in the planetary gear mechanism 351 are represented with symbols: ST for the sun gear 352, RT for the ring gear 355, A for the gear 357, B for the gear 358, C for the gear 361, and D for the gear 359.

$$(1+ST/RT)=(C/D)/(A/B) \qquad \text{(Equation 1)}$$

When it is assumed for example that, the number of teeth ST of the sun gear 352 is 20, the number of teeth of the planetary gears 33 is 20, and the number of teeth RT of the ring gear 355 is 60, the numbers of teeth of the above-mentioned four gears 357 (A), 358 (B), 361 (C), and 359 (D) according to the equation (1) above become as shown in the Table 1 below.

TABLE 1

|       | A  | B  | C  | D  |
|-------|----|----|----|----|
| Ex. 1 | 14 | 14 | 16 | 12 |
| Ex. 2 | 28 | 28 | 32 | 24 |
| Ex. 3 | 35 | 35 | 40 | 30 |

Again, this embodiment like the previously described embodiments employs a differential planetary transmission that transfers no actual driving forces. Thus, all of the gears of this planetary transmission and those gears which transmit drive to it can be formed from low cost plastic materials.

Embodiment of FIG. 19

FIG. 19 shows another embodiment, which is indicated generally by the reference numeral 401 and which employs basically the same components shown in FIG. 18 but in a different driving relationship. Therefore, for ease of understanding, the same reference numerals utilized to identify components which are the same as those previously described are employed. However, the driving relationship is different as will now become apparent.

In this embodiment, the sensor shaft 55 is coupled to the ring gear 355 and driven by it. Thus, the ring gear provides the output signal for the torque sensor 49.

The driving gear 357 driven by the crankshaft 23 drives the driven gear 358 as with the previously described embodiment. However, in this embodiment, the driven gear 358 is coupled directly to the sun gear 352 and drives it. The suitable bearing arrangement shown in FIG. 19 supports these shafts.

Also, the driven gear 359 which is driven by the driving gear 361 associated with the driving shaft 328 is coupled to the carrier 354 and drives it.

Again, it is necessary to choose the ratios of the various gears in both the driving relationship to the planetary transmission 351 and within the planetary transmission, so as to ensure that the potentiometer shaft 55 will be rotated when there is relative rotation between the crankshaft 23 and the driving shaft 28. Therefore, the following relationships must exist.

The gears 357 and 358 interconnecting the pedal crankshaft 23 and the sun gear 352 are formed with different numbers of teeth (diameter). The gears 361 and 359 interconnecting the driving shaft 28 and the carrier 354 are formed with the same number of teeth. Also, the number of teeth of the gears 361 and 359 are made different from the numbers of teeth of the gears 357 and 358.

If the numbers of teeth of the components of the planetary gear mechanism 351, and the numbers of teeth of the gears 357, 358, 361, and 359 are set so that the Equation (2) below is satisfied, the input shaft 55 of the rotation angle detecting sensor 49 is stationary when no difference in rotation phase is present between the pedal crankshaft 23 and the driving shaft 28. However, when a difference in rotation phase occurs between the pedal crankshaft 23 and the driving shaft 28, the input shaft 55 of the rotation angle detecting sensor 49 rotates.

In the Equation (2) below, the numbers of teeth in the planetary gear mechanism 351 are represented with symbols: ST for the sun gear 352, RT for the ring gear 355, A for the gear 357, B for the gear 358, C for the gear 361, and D for the gear 359.

$$(RT/ST)+1=(A/B)/(C/D) \qquad \text{(Equation 2)}$$

When it is assumed for example that, the number of teeth ST of the sun gear 352 is 20, the number of teeth of the planetary gears 46 is 20, and the number of teeth RT of the ring gear 355 is 60, the numbers of teeth of the above-mentioned four gears 357 (A), 358 (B), 361 (C), and 359 (D) according to the equation (2) above become as shown in the Table 2 below.

TABLE 2

|       | A  | B  | C  | D  |
|-------|----|----|----|----|
| Ex. 1 | 48 | 12 | 30 | 30 |
| Ex. 2 | 56 | 14 | 35 | 35 |
| Ex. 3 | 64 | 16 | 40 | 40 |

Figure 20:
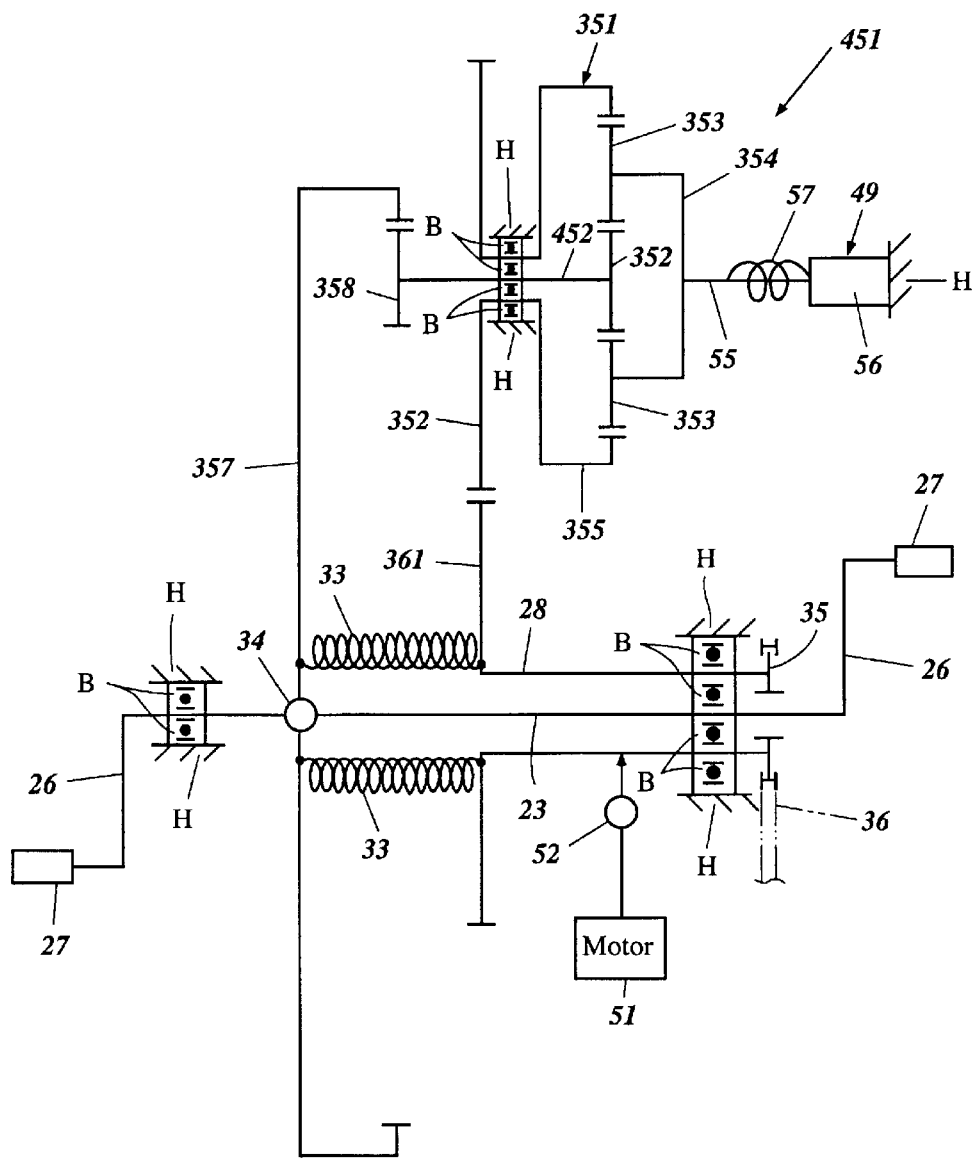
FIG. 20 is a partially schematic cross sectional view, in part similar to FIGS. 1, 2, 3, 11, 16, 18 and 19, and shows a still further embodiment of the invention.

Embodiment of FIG. 20

Finally, FIG. 20 shows the last embodiment of the invention and it is indicated by the reference numeral 451. Again, the planetary transmission 351 and drive for it is of the same general type as previously described. Therefore, components of these transmissions are identified by the same reference numerals and only the manner in which they are drivingly connected differs.

In this embodiment, the carrier 354 of the planetary transmission 351 provides the output signal to and drives the potentiometer shaft 55. The sun gear 352 in this embodiment is driven by the crankshaft 23 and hence the driven gear 358 is coupled directly to the sun gear through a drive shaft 452. Because of this relationship, the gear 357 and 358 comprise an internal gear and an external gear, respectively.

The ring gear 355 of this embodiment is driven by the driven gear 359 which is driven from the driving shaft 28 by the driving gear 361.

In order to achieve a relationship where relative rotation between the shafts 23 and 28 results in rotation of the potentiometer shaft 55, the following relationships must exist.

The gears 357 and 358 interconnecting the pedal crankshaft 23 and the sun gear 54 are formed with different numbers of teeth (different diameters). The gears 361 and 359 interconnecting the driving shaft 28 and the ring gear 355 are formed with the same number of teeth. Also, the number of teeth of the gears 361 and 359 is made different from the numbers of teeth of the gears 357 and 358.

If the numbers of teeth of the components of the planetary gear mechanism 351, and the numbers of teeth of the gears 357, 358, 361, and 359 are set so that the Equation (3) below is satisfied, the input shaft 55 of the sensor 49 is stationary when no difference in rotation phase occurs between the pedal crankshaft 23 and the driving shaft 28. However, when a difference in rotation phase occurs between the pedal crankshaft 23 and the driving shaft 28, the input shaft 55 of the sensor 49 rotates.

In the Equation (3) below, the numbers of teeth of gears in the planetary gear mechanism 351 are represented with symbols: ST for the sun gear 352, RT for the ring gear 355, A for the gear 357, B for the gear 358, C for the gear 361, and D for the gear 359.

$$(RT/ST) = (A/B)/(C/D) \quad \text{(Equation 3)}$$

When it is assumed for example that, the number of teeth ST of the sun gear 352 is 20, the number of teeth of the planetary gears 353 is 20, and the number of teeth RT of the ring gear 355 is 60, the numbers of teeth of the above-mentioned four gears 357 (A), 358 (B), 361 (C), and 359 (D) according to the equation (3) above become as shown in the Table 3 below.

TABLE 3

|       | A  | B  | C  | D  |
|-------|----|----|----|----|
| Ex. 1 | 36 | 12 | 30 | 30 |
| Ex. 2 | 54 | 18 | 45 | 45 |
| Ex. 3 | 72 | 24 | 60 | 60 |
| Ex. 4 | 90 | 30 | 75 | 75 |

Like all other embodiments, the gears including the differential planetary gear set in this embodiment transmit no driving loads and hence can be made from lightweight low-cost materials such as plastics. Although plastics are mentioned, other light weight materials such as aluminum also may be employed.

Thus, from the foregoing description it should be readily apparent that the described embodiments of the invention provide very compact, lightweight and low-cost torque sensors for power assisted, manually operated vehicles and which afford greater latitude in the placement of the components and more easy adaptability to conventional manually powered vehicles than the prior art type of construction. Of course, the foregoing description is that of the preferred embodiments of the invention. Various changes and modifications may be made without departing from the spirit and scope of the invention, as defined by the appended claims.

What is claimed is:

1. A power assisted, manually powered vehicle having at least one driving wheel, an operator driven driving member to which an operator applies a force manually, a first transmission coupling said operator driven driving member to said driving wheel for operator powered driving of said vehicle, said first transmission including a lost motion connection between said operator driven driving member and driving wheel, an assist motor for exerting a driving force to said vehicle through a second transmission, a differential transmission connected between said operator driven driving member and said driving wheel for providing a signal indicative of change in phase between said operator driven driving member and said driving wheel, said wheel being driven by a sprocket forming a portion of said first transmission and said lost motion connection is formed by said sprocket and an adjacent disk shaped member and juxtaposed to said sprocket and driven by said first transmission, said lost motion connection being resiliently biased to resist relative rotation.

2. A power assisted, manually powered vehicle as set forth in claim 1 wherein the sprocket is coupled to one component of the differential transmission and the adjacent disk shaped member is coupled to one component of the differential transmission.

3. A power assisted, manually powered vehicle as set forth in claim 2 wherein the differential transmission comprises a pair of interconnected planetary transmissions, each of said planetary transmissions having a sun gear element, a plurality of planet gears engaged with said sun gear element and carried by a carrier element, and a ring gear element engaged with said planet gears.

4. A power assisted, manually powered vehicle as set forth in claim 3 wherein one of the elements of the first planetary transmission is driven by the disk shaped member and one of the elements of the second planetary transmission is driven by the sprocket.

5. A power assisted, manually powered vehicle as set forth in claim 4 wherein another one of the elements of the first planetary transmission is coupled to another one of the elements of the second planetary transmission and the sensor is driven by one of the elements of one of the planetary transmissions.

6. A power assisted, manually powered vehicle as set forth in claim 5 wherein the axes of the sun gear elements of the planetary transmissions are parallel to an axis of rotation of the operator driven driving member.

7. A power assisted, manually powered vehicle having at least one drivinig wheel, an operator driven driving member to which an operator applies a force manually, a first transmission coupling said operator driven driving member to said driving wheel for operator powered driving of said vehicle, said first transmission including no gears formed from aluminum or plastic, an assist motor for exerting a driving force to said vehicle through a second transmission, said second transmission including no gears formed from aluminum or plastic, a differential transmission comprised of at least one planetary transmission comprised of a sun gear element, a planer carrier element journalling a plurality of planet gears enmeshed with said sun gear element, and a ring gear element enmeshed with said sun gears, at least one of said planetary transmission elements being drivingly connected to said operator driven driving member and at least another of said planetary transmission elements being drivingly connected to said driving wheel for providing a signal indicative of change in phase between said operator driven driving member and said driving wheel, said differential transmission transmits no driving force between the operator driven driving member and the driving wheel and having its gears formed from a material selected from the group consisting of a plastic or aluminum, a phase change sensor associated with said differential transmission for providing a signal indicative of said change in phase, and control means responsive to the output signal of said phase change sensor for supplying an amount of power from said assist motor for assisting the driving of said vehicle said assist motor driving a wheel of the vehicle other than the driving wheel.

* * * * *